US008812550B2

(12) United States Patent
Schaaf et al.

(10) Patent No.: US 8,812,550 B2
(45) Date of Patent: Aug. 19, 2014

(54) SYSTEMS, METHODS AND APPARATUS FOR ASSESSING COMPLIANCE AND FEDERATING DATABASES

(75) Inventors: Andrew Schaaf, Clifton, VA (US); Ted Hobson, Annandale, VA (US)

(73) Assignee: Engineering, Management and Integration, Inc., Herndon, VA (US)

( * ) Notice: Subject to any disclaimer, the term of this patent is extended or adjusted under 35 U.S.C. 154(b) by 69 days.

(21) Appl. No.: 13/116,094

(22) Filed: May 26, 2011

(65) Prior Publication Data

US 2011/0231442 A1  Sep. 22, 2011

Related U.S. Application Data

(62) Division of application No. 12/166,103, filed on Jul. 1, 2008, now abandoned.

(60) Provisional application No. 60/929,539, filed on Jul. 2, 2007.

(51) Int. Cl.
*G06F 21/00* (2013.01)
*G06F 17/30* (2006.01)
*G06F 21/62* (2013.01)
*G06F 13/14* (2006.01)

(52) U.S. Cl.
CPC ...... *G06F 17/30961* (2013.01); *G06F 21/6218* (2013.01)
USPC ........................................................ 707/786

(58) Field of Classification Search
CPC .................. G06F 17/30592; G06F 17/30595; G06F 17/30566; G06F 17/3061; G06F 17/30861; G06F 17/30893; G06F 17/30917; G06F 17/50; G06F 2217/02; G06F 17/3056; G06F 17/30569; G06F 17/30607; G06F 17/30672; G06F 17/30873; G06F 8/20; G06F 17/30961; G06F 21/6218
USPC .......... 707/1/1, 700, 714, 796, 812, 707, 770, 707/786; 705/35; 700/83
See application file for complete search history.

(56) References Cited

U.S. PATENT DOCUMENTS

| 6,834,282 | B1 | 12/2004 | Bonneau et al. | |
|---|---|---|---|---|
| 2002/0087579 | A1 | 7/2002 | Chasanoff et al. | |
| 2004/0194052 | A1* | 9/2004 | Hoffschulz et al. | 717/100 |
| 2004/0230328 | A1* | 11/2004 | Armstrong et al. | 700/83 |
| 2007/0203718 | A1 | 8/2007 | Merrifield | |
| 2008/0183689 | A1 | 7/2008 | Kubota et al. | |

FOREIGN PATENT DOCUMENTS

WO    WO 97/38373 A1    10/1997

* cited by examiner

*Primary Examiner* — Usmaan Saeed
*Assistant Examiner* — Cecile Vo
(74) *Attorney, Agent, or Firm* — Birch, Stewart, Kolasch & Birch, LLP

(57) ABSTRACT

Systems, methods, and apparatus as discussed herein, provide for enabling a user to select containers and parent level requirements to be retrieved. A navigation panel is provided that enables a user to navigate through the selected containers. A sieve module filters non applicable requirements in the containers based on the selected parent level requirements. The system further joins and integrates compliance information stored within in the Compliance Database, and the associated requirements stored in the containers. The system further stores, manages and reports compliance information associated with specific requirements located in the identified container. Additionally, a federation module may enable user to link requirements located in different containers, and may copy requirements from one container and paste into another container.

9 Claims, 22 Drawing Sheets

Container Query not using the Sieve Filter

Container Query Structure:

SELECT [obj_tbl_nm].[object attribute 1], [obj_tbl_nm].[object attribute 2], ... [obj_tbl_nm].[object attribute x]

FROM [obj_tbl_nm]

*FIG. 12A*

CONTAINER QUERY USING THE SIEVE FILTER

CONTAINER QUERY STRUCTURE:

SELECT [OBJ_TBL_NM].[OBJECT ATTRIBUTE 1], [OBJ_TBL_NM].[OBJECT ATTRIBUTE 2]... [OBJ_TBL_NM].[OBJECT ATTRIBUTE X]

> THESE ARE THE ATTRIBUTES ASSOCIATED WITH THE OBJECT REQUESTED BY THE USER. AT CONFIGURATION TIME THE NAME OF ATTRIBUTES ARE REGISTERED IN THE "SIEVE_OBJECT_ATTRIBUTE" TABLE AND REPRESENT COLUMNS ASSOCIATED WITH THE TABLE (E.G., OBJ_TBL_NM) STORING THE OBJECT INFORMATION IN THE CONTAINER DATABASE.

FROM [JOIN_TBL_NM]

> REPRESENTS THE TABLE JOINING THE PARENT AND CHILD OBJECTS. THE VALUE FOR THIS IS ENTERED IN THE "SIEVE_OBJECT" TABLE AT CONFIGURATION TIME.

INNER JOIN [OBJ_TBL_NM]

> REPRESENTS THE TABLE CONTAINING THE OBJECT INFORMATION REQUESTED BY THE USER. THE VALUE FOR THIS IS ENTERED INTO THE "SIEVE_OBJECT" TABLE AT CONFIGURATION TIME.

ON [JOIN_TBL_NM].[JOIN_TBL_CHILD_FK_FIELD_NM] = [OBJ_TBL_NM].[OBJ_PK_FIELD]

> THE CLAUSE JOINING THE CHILD OBJECTS WITH ITS PARENT OBJECTS. THE VALUES FOR THIS CLAUSE ARE ENTERED INTO THE "SIEVE_OBJECT" TABLE AT CONFIGURATION TIME.

FILTER STRUCTURE:

WHERE [JOIN_TBL_NM].[JOIN_TBL_CHILD_FK_FIELD_NM]

> REPRESENTS THE TABLE AND COLUMN IN THE CONTAINER DATABASE STORING THE PARENT OBJECT REFERENCE AND ITS RELATIONSHIP TO ITS CHILD OBJECTS.

IN ([SELECTED PARENT RECORD POINTER 1], [SELECTED PARENT RECORD POINTER 2]... [SELECTED PARENT RECORD POINTER X])

> VALUES POINTING TO PARENT OBJECTS PREVIOUSLY SELECTED BY THE USER AND STORED IN THE COMPLIANCE DATABASE.

FEDERATION PACKAGE DESIGNER

MENU NAME

NAME [ENTER TEXT]   STATUS [ENTER TEXT ▼]

DESCRIPTION
ENTER TEXT
ENTER MORE TEXT

INFORMATION FROM THESE CONTROLS ARE DERIVED FROM THE "FEDERATED_PACKAGE" TABLE. THE STATUS COMBO BOX IS POPULATED USING THE CONTENTS OF THE "STATUS" TABLE.

FEDERATED CONTAINERS

| NAME | DESCRIPTION |
|---|---|
| BEA 4.1 | ▼ DOD BUSINESS ENTERPRISE ARCHITECTURE VERSION 4.1 |
| ACSA | ▼ AIR FORCE COMBAT SUPPORT ARCHITECTURE |

[ADD A CONTAINER]

INFORMATION FROM THIS CONTROL IS DERIVED FROM THE "FEDERATED_CONTAINER" TABLE. THE COMBO BOX (E.G. NAME) IS POPULATED USING THE CONTENTS OF THE "CONTAINER" TABLE.

OBJECT ALIGNMENT

| ID | FEDERAL OBJECTS | STATE OBJECTS | | |
|---|---|---|---|---|
| 1 | OP ACTIVITY (BEA 4.1) ▼ | PROCESS (ACSA) ▼ | | |
| 2 | IE (BEA 4.1) ▼ | MESSAGE (ACSA) ▼ | | |
| 3 | BUSINESS RULE (BEA 4.1) ▼ | EVENT RULE (ACSA) ▼ | | |

[CREATE A NEW ALIGNMENT]

INFORMATION FROM THIS CONTROL COMES FROM THE "SIEVE_OBJECT_ALIGNMENT" TABLE. COMBO BOXES PULL INFORMATION FROM THE "SIEVE_OBJECT" AND "CONTAINER" TABLES FILTERED BY CONTAINER SELECTED FOR FEDERATION. THE TEXT IN THE BOX IS A CONCATENATION OF [SIEVE_OBJECT].[OBJ_TYPE] AND [CONTAINER].[NM]

ALIGNMENT VALUES

| OBJ. ALIGNMENT ID | VALUE |
|---|---|
| 1 | IS THE SAME AS |
| 1 | EXTENDS |
| 1 | IS PART OF |

[ADD NEW VALUE]

THIS IS A SUBFORM FOR THE "OBJECT_ALIGNMENT" FORM. INFORMATION FROM THIS CONTROL COMES FROM THE "ALIGNMENT_VALUE" TABLE.

QUESTIONS
- WHAT VALUE DO THE ROLES OF THE CONTAINER PROVIDE
- HOW DOES THE "FEDERATED OBJECT" DROPDOWN IN THE "OBJECT ALIGNMENT" GRID WORK IF THERE ARE 3 OR MORE CONTAINERS.
- NEED TO MAKE THE "ALIGNMENT VALUES" GRID A CHILD OF "OBJECT ALIGNMENT" GRID

SYSTEMS, METHODS AND APPARATUS FOR ASSESSING COMPLIANCE AND FEDERATING DATABASES

RELATED APPLICATIONS

This application is a divisional of U.S. patent application Ser. No. 12/166,103 filed Jul. 1, 2008 now abandoned which is related to and claims priority to U.S. Provisional Application No. 60/929,539 filed on Jul. 2, 2007, entitled "SYSTEMS AND METHODS FOR ASSESSING COMPLIANCE", which is expressly incorporated herein by reference in its entirety.

BACKGROUND OF THE INVENTION

1. Field of the Invention

The invention relates generally to networked applications and more specifically, to systems and methods of assessing compliance and federating database contents.

2. Description of Related Art

Large complex sets of requirements, sometimes known as architectures, are developed by organizations desiring to influence or guide the direction of entities (e.g., systems, programs, policies, an agency etc.) within those organizations. These architectures, here within are referred to as containers, are typically highly structured and hierarchical; defining multiple levels of parent to child relationships between requirements in order to provide context and understanding of those requirements. The information in containers may be stored in a computer aided software engineering (CASE) tool, relational database, XML document or a set of XML documents.

Often, entities (e.g., systems, programs, policies, agencies etc.) are required to demonstrate compliance to an architecture, in most cases only to a sub set of the requirements in the architecture. This however is not a simple task due to the complexity and volume of the requirements. Additionally, the tools used to create these requirements have not been intended to be used for the purpose of demonstrating compliance.

This leaves individuals responsible for the entities within the organizations with two primary options: manually perform a compliance assessment or customize tools in which the requirements were developed to capture compliance related information. Both of these options are impractical and inefficient. Manually performing a compliance assessment requires an individual to 1) physically create a new spreadsheet or database, 2) search for the appropriate requirements, 3) duplicate, by manually copying, requirements from the source requirements database into that new spreadsheet or database and 4) record the compliance information for each of those requirements. CASE tools used to build these architectures were designed to facilitate building monolithic systems or software applications not groups of systems or applications, certainly not demonstrating compliance of many entities to the architecture. As a result, these tools require radical changes to their configuration and functional enhancements in order to capture compliance information for more than one entity. To further complicate the issue it is possible and common that an entity is required to comply with more than one architectures or set of requirements (i.e., containers).

As such, there is a need for a method, system and apparatus that enables a user to easily identify appropriate requirements and indicate compliance with the identified requirements. There is also a need to show relationships between two or more requirements that are stored in different containers.

SUMMARY OF THE INVENTION

Systems, methods, apparatus and computer-readable mediums, consistent with the principles of some embodiments of the invention provide for creating a filter to extract requirement information from a remote database, the method comprising creating and executing a first query at a local database to retrieve at least one parent level object previously selected by a user; retrieving the at least one parent level object based on the executed query; obtaining meta data from a local database, the meta data relating to the remote database and the meta data being associated with the retrieved at least one parent level object creating a filter to be executed against the remote database based on the retrieved at least one parent level object and based on the obtained meta data associated with the retrieved at least one parent level object; wherein the filter is combined with a second query to be executed at the remote database to retrieve only sub-parent level objects associated with the retrieved at least one parent level object.

Alternatively, systems, methods and computer-readable mediums, consistent with the principles of some embodiments of the invention provide for accessing data stored in at least one of a plurality of remote databases, the method comprising enabling access to the plurality of databases, at least two of the plurality of remote databases having different data structures; receiving input identifying at least one of the plurality of remote databases for accessing; obtaining meta data locally stored and associated with the identified at least one remote database; generating a navigation control and displaying the navigation control on a display; receiving input from a user identifying an object type; creating and executing a first query at the identified at least one remote database to obtain all parent level objects associated with the at least one object type; receiving input identifying at least one selected parent level object from the obtained parent level objects and storing the input; obtaining meta data from a local database, the meta data relating to the at least one remote database and the meta data being associated with the selected at least one parent level object; and creating and executing a second query at the at least one remote database to retrieve only sub-parent level objects associated with the selected at least one parent level object, wherein the second query includes a filter, based on the meta data and the selected at least one parent level object, for filtering out sub-parent level objects that are only associated with non-selected parent level objects.

Alternatively, systems, methods and computer-readable mediums, consistent with the principles of some embodiments of the invention provide for accessing data stored in at least one of a plurality of remote databases, the method comprising enabling access to the plurality of databases, at least two of the plurality of remote databases having different data structures; receiving input from a user identifying one of the plurality of remote databases for accessing; obtaining meta data locally stored and associated the identified one remote database; generating a navigation control and displaying the navigation control on a display; receiving input from the user identifying an object type; receiving input from the user identifying at least one parent object associated with the selected object type; and retrieving from the remote database only those children objects that are associated with the identified parent objects based on a query and a filter, the filter created based on the meta data associated with the identified one remote database and the selected at least one selected parent object.

Alternatively, systems, methods and computer-readable mediums, consistent with the principles of some embodiments of the invention provide for accessing data stored in at least one of a plurality of remote databases, the apparatus comprising a sieve module configured to create custom, dynamic filters to be executed against the plurality of remote databases based on selected parent level objects and based on meta data associated with the plurality of remote databases, the filter, when combined with a query, enables selection of only those children objects associated with the selected parent level objects; a container meta data management module configured to receive and process requests for meta data associated with the plurality of remote data bases; and a container query generator configured to create and execute queries based on meta data provided by the container meta data management module and further based on filters created by the sieve module and further configured to provide the results of the queries for display.

Alternatively, systems, methods and computer-readable mediums, consistent with the principles of some embodiments of the invention provide for accessing data stored in at least one of a plurality of remote databases and storing data associated with the accessed data, the method comprising generating a navigation control for navigating a remote database based on locally stored meta data; displaying the navigation control; receiving input from the user identifying an object type; receiving input from the user identifying at least one parent object associated with the selected object type; retrieving from the remote database only those children objects that are associated with the identified parent objects based on a query and a filter, the filter created based on the meta data associated with the identified one remote database and the selected at least one selected parent object; retrieving from the local database data associated with the retrieved children objects; and displaying the retrieved children objects and the data associated with the retrieved children objects.

Alternatively, systems, methods and computer-readable mediums, consistent with the principles of some embodiments of the invention provide for accessing data stored in at least one of a plurality of remote databases and storing data associated with the accessed data, the apparatus comprising a sieve module configured to create custom filters to be executed against the plurality of remote databases based on selected parent level objects and based on meta data associated with the plurality of remote databases, the filter, when combined with a query, enables selection of only those children objects associated with the selected parent level objects; a container meta data management module configured to receive and process requests for meta data associated with the plurality of remote data bases; a container query generator configured to create and execute queries based on meta data provided by the container meta data management module and further based on filters created by the sieve module and further configured to provide the results of the queries for display; and a compliance database configured to store meta data associated with the plurality of remote databases and further configured to store compliance information associated with parent and children objects stored in the plurality of remote databases.

Alternatively, systems, methods and computer-readable mediums, consistent with the principles of some embodiments of the invention provide for a method for associating requirements included in containers, the method comprising receiving input identifying at least two remote containers; accessing meta data from a local database associated with the identified at least two containers; displaying the identified at least two containers and at least one of the requirements of each of the identified at least two containers simultaneously on a display in accordance with the accessed meta data; enabling linking of two requirements, wherein the two requirements are not located within the same container; receiving input identifying two requirements to be linked; displaying an indication that the two requirements are linked; and storing information relating to the link of the two requirements in the local database.

BRIEF DESCRIPTION OF THE DRAWINGS

The accompanying drawings, which are incorporated in and constitute a part of this specification, illustrate embodiments of the invention and, together with the description, explain the principles of the invention. In the drawings:

FIG. 12A depicts an exemplary container query structure that does not include the filter created by the sieve module, consistent with the principles of some embodiments of the present invention;

FIG. 12B depicts an exemplary container query structure that includes the filter created by the sieve module, consistent with the principles of some embodiments of the present invention;

FIGS. 15-16 depict exemplary screen shots, presented to a user, relating to a federation module, consistent with the principles of some embodiments of the present invention;

DETAILED DESCRIPTION

Figure 1:
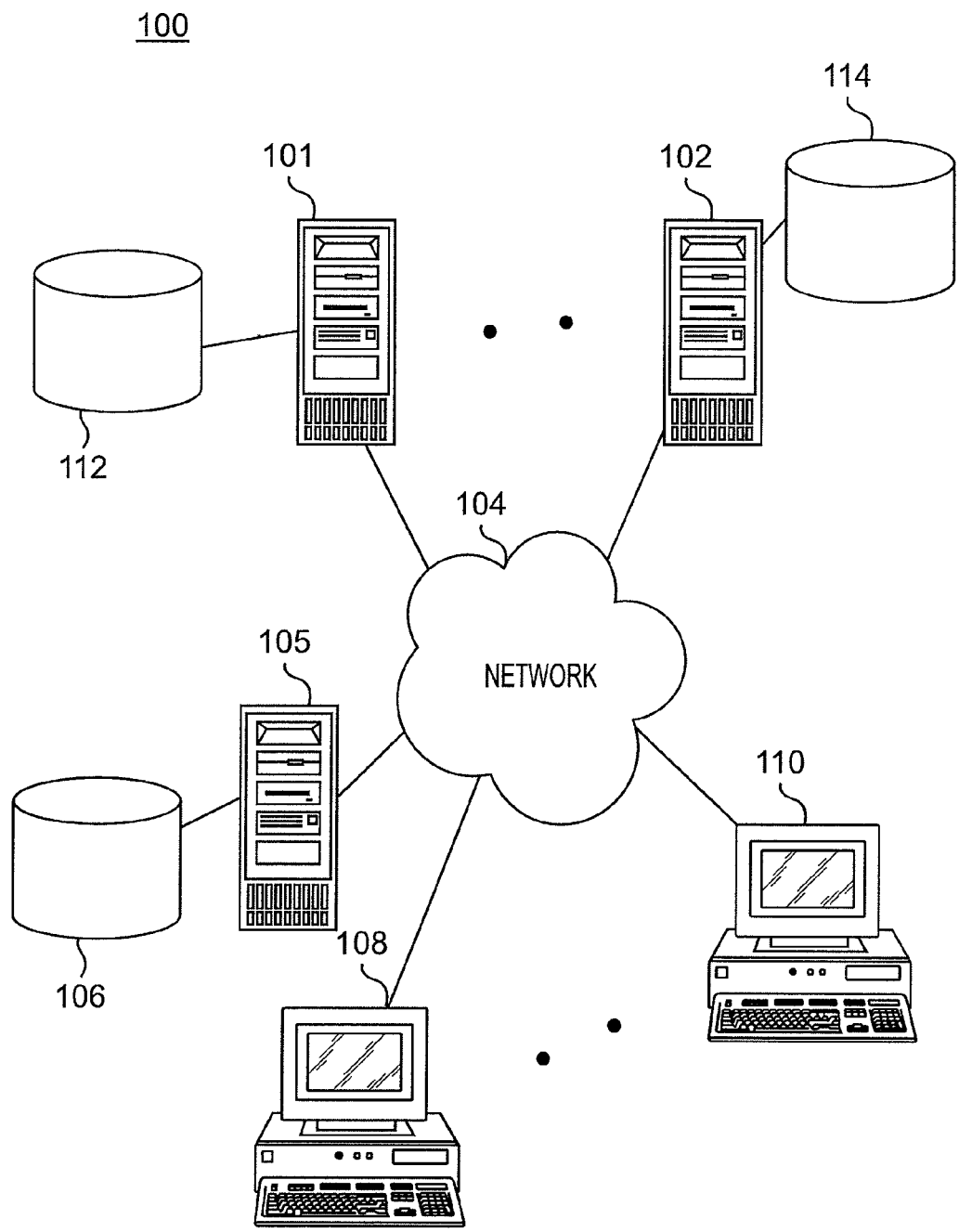
FIG. 1 is an exemplary system environment for implementing the features consistent with some embodiments of the present invention.

Reference will now be made in detail to the features of the principles of the present invention, examples of which are illustrated in the accompanying drawings. Wherever possible, the same reference numbers will be used throughout the drawings to refer to the same or like parts.

It is a feature of some embodiments of the invention to provide the capability and process for demonstrating compliance with one or more large and complex volumes of requirements that is less complicated, easier to carry out and more efficient than in the prior art.

In addition to capturing compliance information associated with requirements, this system, consistent with some embodiments of the invention, can be used for other Government or commercial purposes such as capturing information to qualify intelligence data in an intelligence database or capturing customer survey information on the contents of a company's inventory databases. It may be appreciated that the systems and methods discussed herein may be applicable to numerous communities and applications as follows:

Intelligence community—The federation module could enable two case management systems from two different agencies to fuse intelligence and investigative information. Data collected by one agency, against a criminal suspect, and stored in their case management system could be linked with related records in different agencies case management system to provide a comprehensive picture of evidence that could enable the justification for prosecution.

Building industry/architects—The ACART compliance assessment tool could enable streamlined identification and assessments of building plans against building codes and regulations.

Power industry—The ACART compliance assessment tool could enable new power plant designs to be evaluated against Government regulations. It could be used as the certification tool by the Government to approve development of all new power plants.

Pharmaceuticals industry—The ACART compliance assessment tool could enable Pharmaceuticals companies to document new drug developments compliance against FDA laws and regulations.

Oil companies—The ACART compliance assessment tool could enable oil companies to document drilling and refinement operations compliance to EPA regulations. It could also enable visibility and monitoring by the EPA to status and plans of Oil company operations.

Furthermore, this system can be used to associate specific records in one container with requirements in another container.

Generally, principles consistent with some embodiments of the invention provide for the capability for assessing and reporting compliance of an entity (e.g., systems, programs, policies, agency etc.) against one or more containers managed by $3^{rd}$ parties. These containers may be writable. Alternatively, one or more containers may be read-only containers wherein data may not be written to the containers.

Additionally, it provides features, consistent with some embodiments of the invention, that enable: interfacing with read-only containers managed by $3^{rd}$ parties; navigation through the contents of a container; filtering of non applicable requirements in the containers; joining and integrating compliance information, stored within in the Compliance Database, and the associated requirements stored in the containers; and storing, managing and reporting of compliance information associated with specific requirements located in a container managed by a $3^{rd}$ party. Specific features of the system, consistent with some embodiments of the invention, may include implementing a process within a sieve module which enables the user to select high level requirements and subsequently use that selection along with the existing parent to child relationships of requirements within the architecture or requirements database to automatically filter only relevant sub-requirements; enabling linking of requirements in one container with requirements in other containers; wherein compliance information associated with a requirement in container that is linked to a requirement in another container enables reuse of the compliance information; joining and integrating information from the Compliance Database with the associated requirements in the containers, wherein it is possible to prevent storing of requirements in the Compliance Database, as only pointers to the requirements are stored in the Compliance Database.

As discussed herein, it may be appreciated that the terms "object" and "requirement" may be used interchangeably. Further, it may be appreciated that containers are databases storing requirements.

System Architecture

FIG. 1 is an exemplary diagram of a system environment 100 for implementing the principles consistent with some embodiments of the invention. The components of system environment 100 can be implemented through any suitable combinations of hardware, software, and/or firmware. As shown in FIG. 1, system 100 includes a plurality of computing devices 101, 102 communicating with server 105 via network 104. Further, while only two computing devices 101,102 are depicted in FIG. 1, it may be appreciated by one of ordinary skill in the art that more devices may operate within the system environment. Each of the computing devices 101, 102 may be communicably linked to databases 112, 114, respectively. Databases 112, 114 may be implemented as containers, or requirements databases, as discussed herein. It may be appreciated that while only one database appears directly communicably linked to each of computing devices 101, 102, more than one database may be directly communicably linked to one or more of computing devices 101, 102.

Computing devices 101, 102 may store and access data stored in databases 112, 114, respectively. Computing devices 101, 102 may be servers operating on network 104 and may be operated by an entity having a set of requirements or architecture for compliance. It may be appreciated by one skilled in the art that databases 112, 114 may be directly communicably linked to computing devices 101, 102, or may be communicably linked to computing devices 101, 102 through network 104.

Computing devices 101, 102 may be implemented as a server that are configured operate CASE tools that permit data mining and access to the requirement information stored in databases 112, 114.

Network 104 may be implemented as the Internet. It may further be appreciated that alternatively, network 104 may be implemented as any local or wide area network, either public or private. It may further be appreciated that there may be additional networks operating in environment 104 wherein additional devices may interact with server 105.

System environment 100 further includes a plurality of computing 108, 110 communicating with server 105 via network 104. While only two computing devices 108, 110 are depicted in FIG. 1, it may be appreciated by one of ordinary skill in the art that more computing devices may operate within the system environment 100. Computing devices 108, 110 may be operated by a user of the compliance assessment tool through the communicable link with server 105.

Computing devices 108, 110 may be implemented as a personal computer, a workstation, or any personal handheld device, i.e., a Personal Digital Assistant (PDA), a cellular telephone, or any other device that is capable of operating, either directly or indirectly, on network 105 and is capable of accessing application software 308. Computing devices may be configured to communicate with server 105. Computing devices 108, 110 may be operated by users seeking to obtain and provide compliance assessment information.

System environment 100 includes server 105 and database 106. Database 106 may be communicably linked to server 105. Server 105 may store, access, modify, etc. data stored in database 106. Database 106 may store information related to compliance information, container meta data, as discussed herein, user identifying information, etc.

Figure 2:
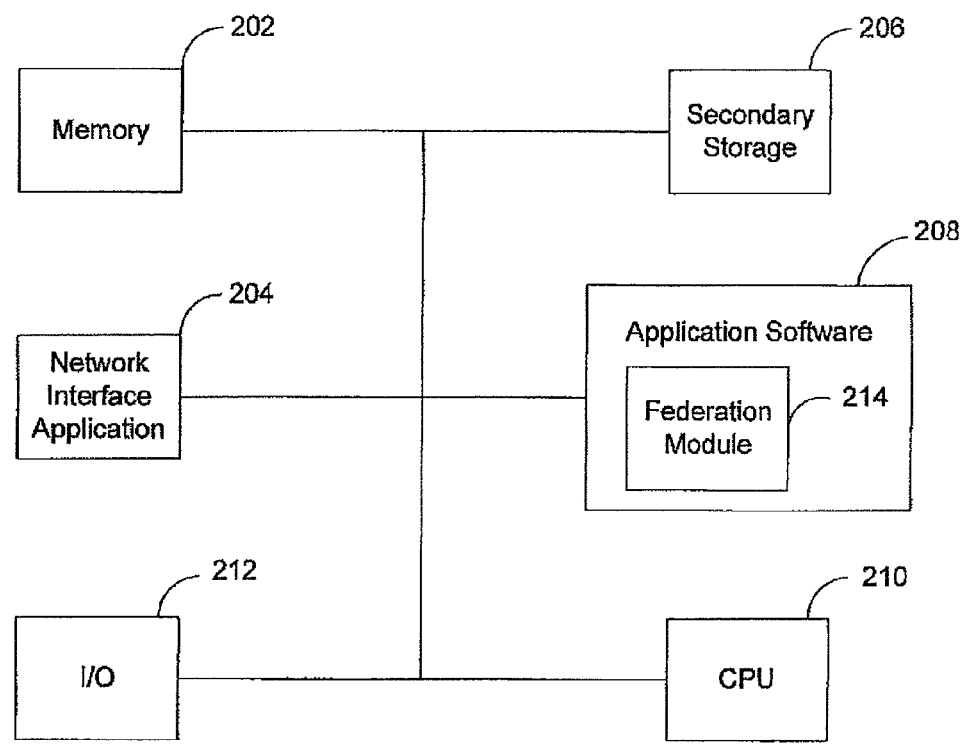
FIG. 2 is an exemplary block diagram of the components of a client computing, consistent with principles of some embodiments of the present invention.

FIG. 2 depicts an exemplary block diagram of computing devices 108, 110 that may be implemented in system environment 100, consistent with the principles of some embodiments of the present invention. As shown in FIG. 2, computing devices 108, 110 include memory 202, network interface application 204, secondary storage 206, application software 208 including client side federation module 214, central processing unit (CPU) 210, and input/output devices 212. Network interface 204 may be implemented as any conventional browser application to facilitate interaction with software applications on server 105 through network 104. Input/output devices 212 may include, for example, a keyboard, a mouse, a video cam, a display, a storage device, and/or a printer.

Figure 3:
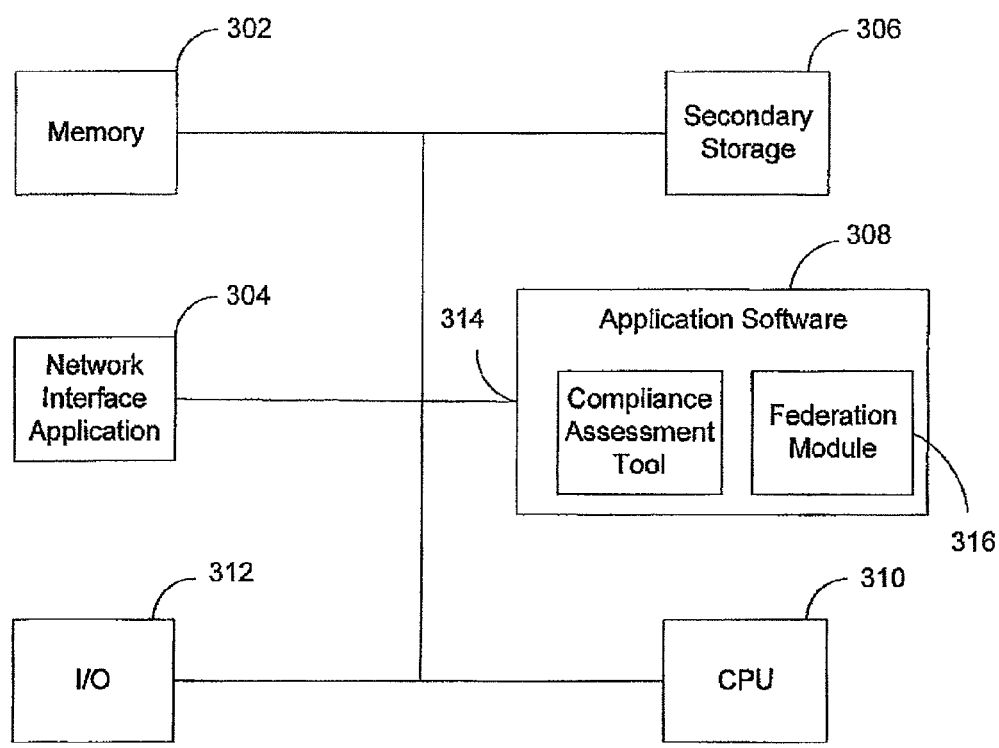
FIG. 3 is an exemplary block diagram of the components of a server computing device, consistent with principles of some embodiments of the present invention.

FIG. 3 depicts an exemplary block diagram of server 105 that may be implemented in system environment 100, consistent with the principles of some embodiments of the present invention. As shown in FIG. 3, server 105 includes memory 302, network interface application 304, secondary storage 306, application software 308, central processing unit (CPU) 310, and input/output devices 312. Application software may include CASE assessment tool 314, federation module 316, and database management application (not shown). Network interface 404 may be implemented as any conventional browser application to facilitate interaction with applications on computing devices 101, 102 and computing devices 108, 110 on network 104. Input/output devices 414 may include, for example, a keyboard, a mouse, a video cam, a display, a storage device, and/or a printer. Server 105 may be communicably linked with computing devices 101, 102 and computing devices 108, 110 using application software 308.

Figure 4:
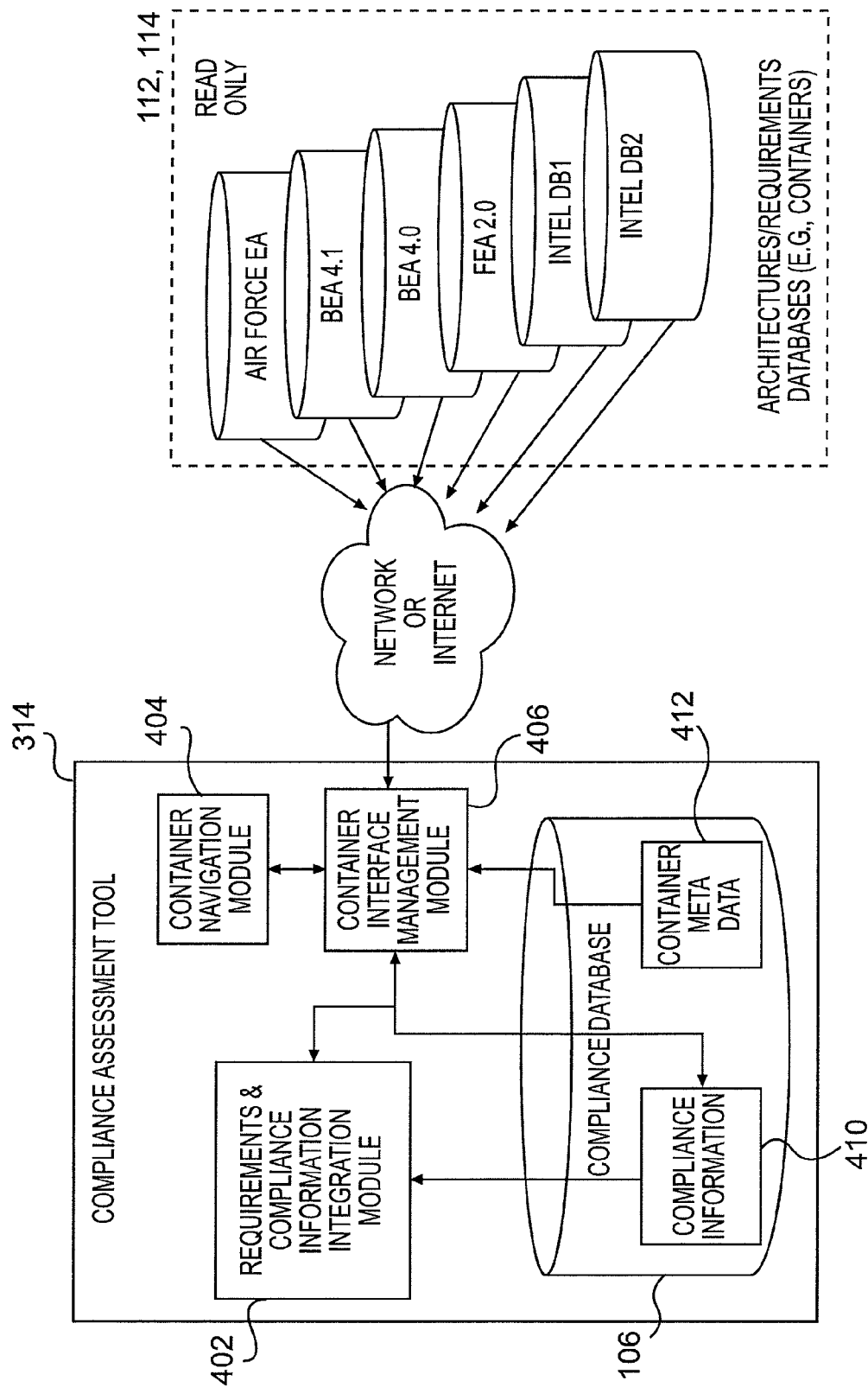
FIG. 4 depicts an exemplary block diagram of the components of a server computing device communicably linked to databases, consistent with principles of some embodiments of the present invention.

Server 105 includes application software 308 that is used to access and provide compliance assessment information. As shown in FIG. 4, Compliance Assessment Tool 314 includes requirements and compliance information integration module 402, container navigation module 404, container interface management module 406, and compliance database 408.

Compliance database 106 includes compliance information 410 and container meta data 412. Architectures/requirement databases (e.g. containers) 112 and 114 are also depicted in FIG. 4. As noted above, these databases 112 and 114 may reside on network 104, either at one computing device or at multiple computing devices. Compliance information may be any information related to the user's compliance with the requirement. The compliance information may be entered by the user and stored in compliance database 106 for present or future access. It may further be appreciated the compliance information may be entered by other users that may or may not be associated with the same organization of the user. When the system checks for stored compliance information in local database 106, any compliance information that is stored therein may be accessed and presented to the user as discussed herein. Alternatively, only that information that the user has permission to view may be accessed and presented.

Compliance database 106 provides a repository of container meta data 412 necessary for the Compliance Assessment Tool to query, navigate and search requirements in a container which is registered in the Compliance Assessment Tool. Further, compliance database 106 stores and manages compliance information along with the pointers to the specific requirements for which that compliance information is associated.

Figure 5:
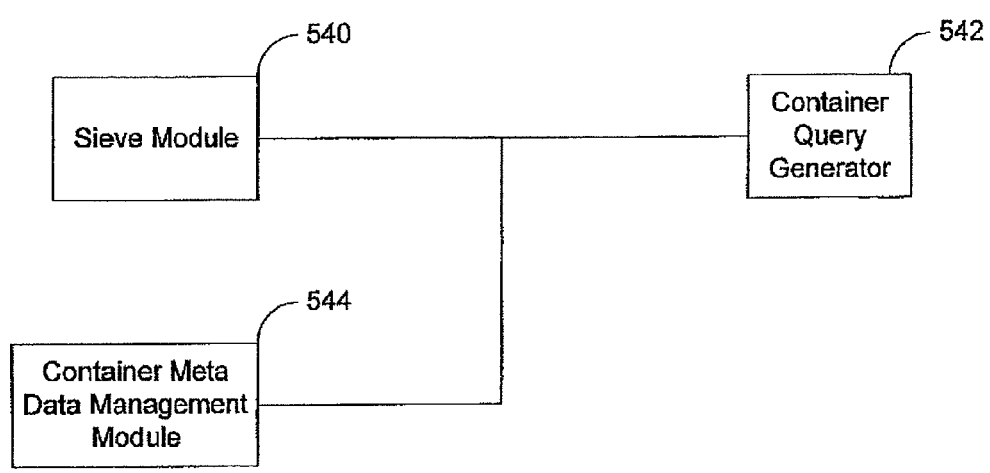
FIG. 5 depicts an exemplary block diagram of the components included in container interface management module, consistent with the principles of some embodiments of the present invention.

FIG. 5 depicts components included in container interface management module 406. Container interface management module includes sieve module 540, container query generator 542 and container meta data management module 544.

Figure 5A:
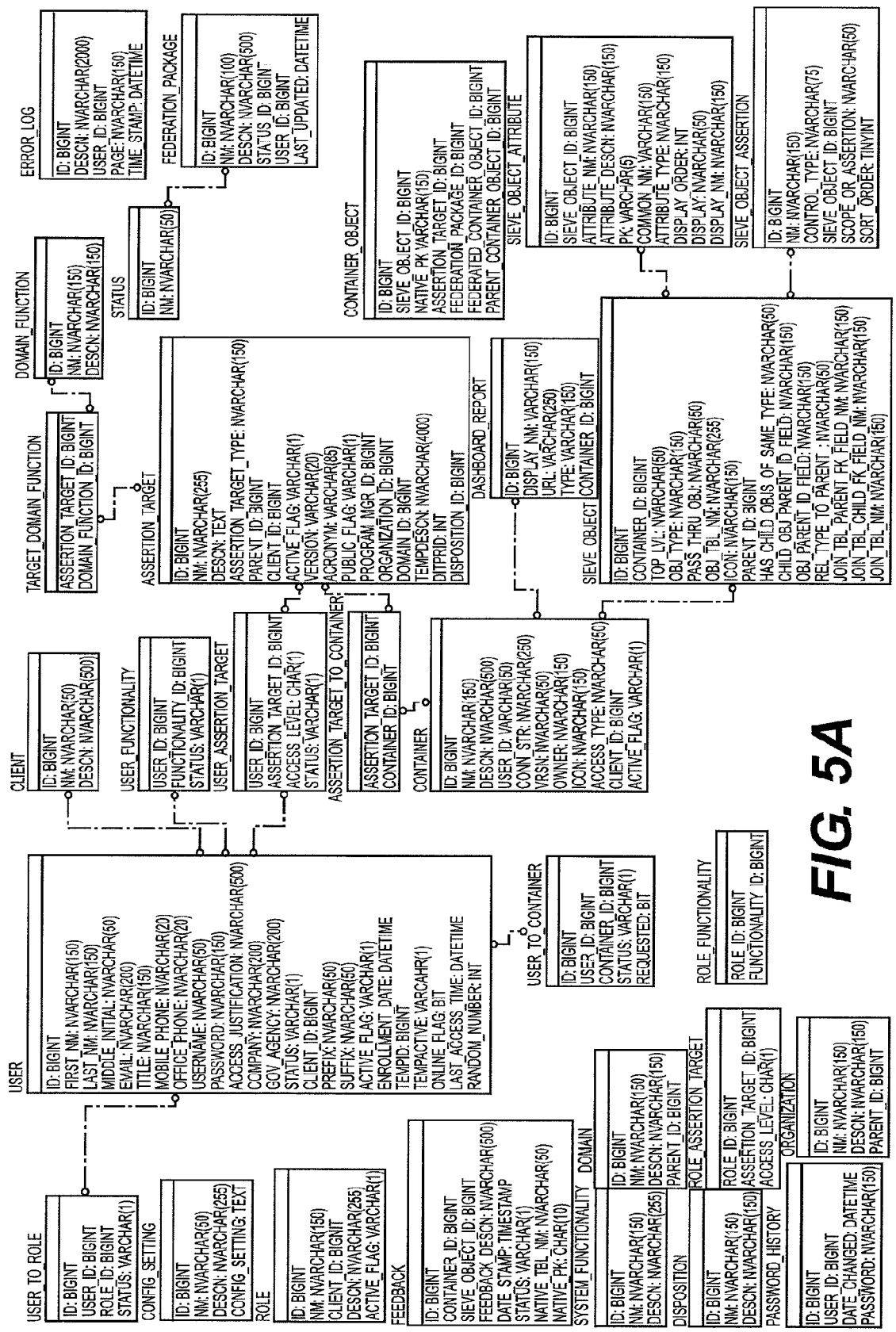
FIG. 5A depicts an exemplary data structure diagram of a data structure relating to a software application, consistent with the principles of some embodiments of the present invention.
Figure 5A:
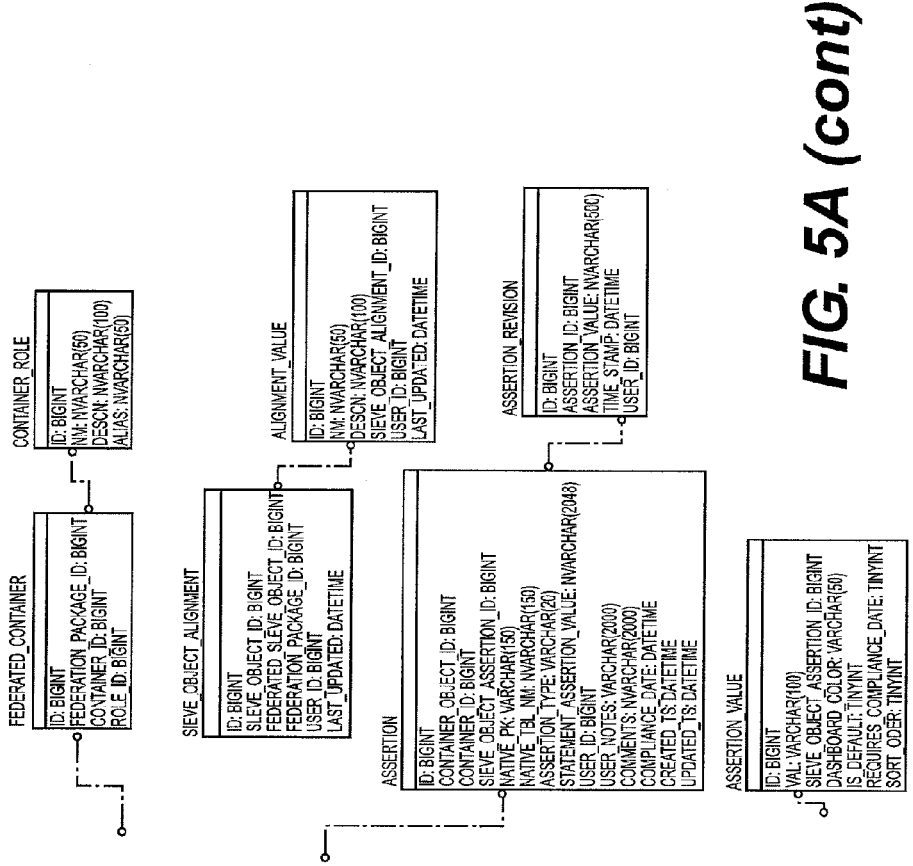
Figure 6A:
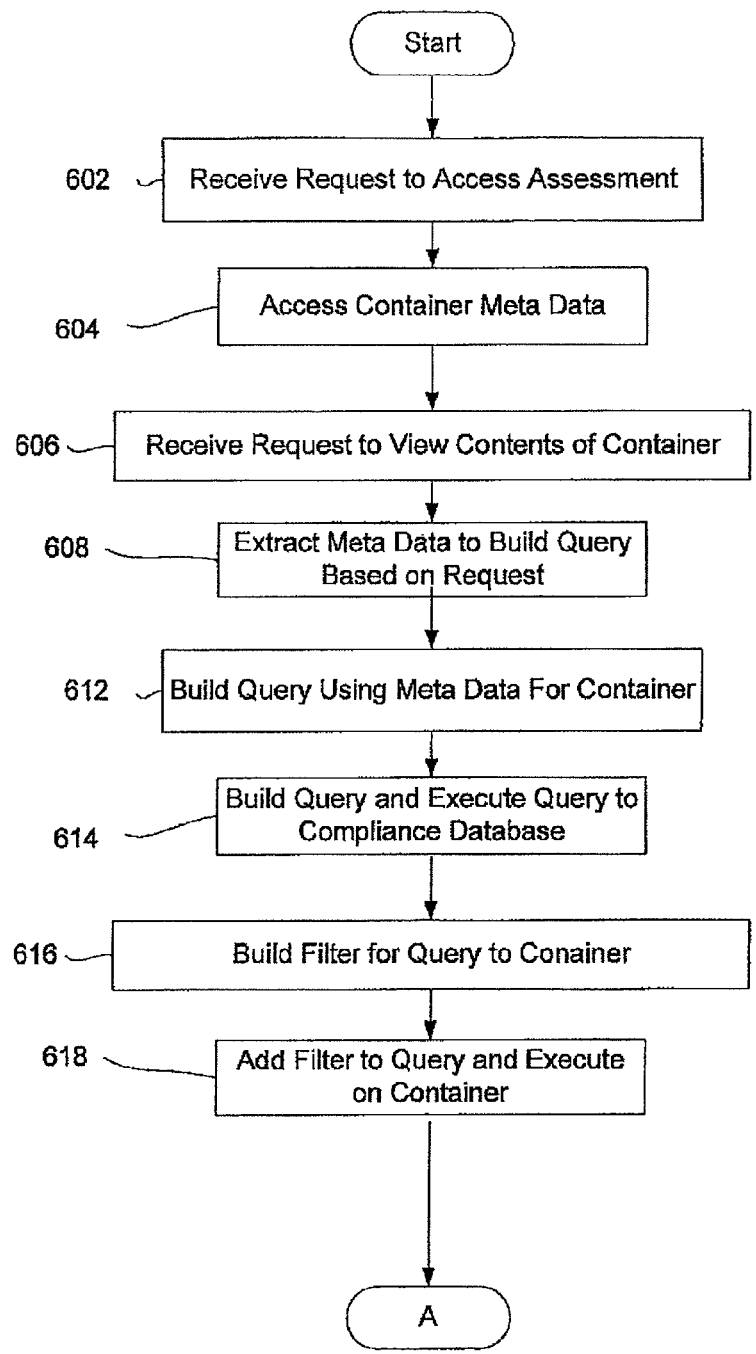
FIGS. 6A-6B depict an exemplary flow diagram of the steps performed within the system environment, consistent with the principles of some embodiments of the present invention.
Figure 6B:
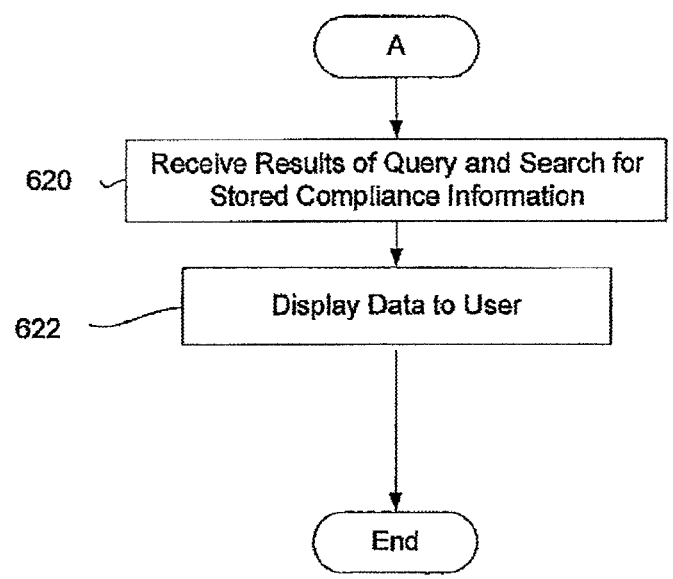

FIG. 5A depicts an exemplary data structure diagram of a data structure relating to software application 308 and system 100, consistent with the principles of some embodiments of the present invention.
System Flow FIGS. 6A-6B depicts an exemplary flow diagram of the steps performed within system 100 consistent with the principles of some embodiments of the invention. The following example provides a description of how the system would enable a user to navigate through a container and record compliance information for a fictional entity (i.e., Program Z) against requirements in that container Business Enterprise Architecture (i.e., BEA 4.1).

Prior to using the system to assert compliance to requirements in a container, the administrator of the system may register the meta data for each container. The container meta data stored in the Compliance Database holds technical information for operating the Compliance Assessment Tool to establish a network connection to the containers. It also stores the physical attributes as to how information (e.g., requirements, inventory items, intelligence data, etc.) is stored and structured (i.e., the relationships between the different objects containing requirements, inventory items or intelligence data) in the container. This information facilitates a system, using requirement information and pointer information to access and retrieve information stored in the containers. Each of the containers may have their own proprietary meta data that facilitates access and retrieval of requirement information.

Figure 7:
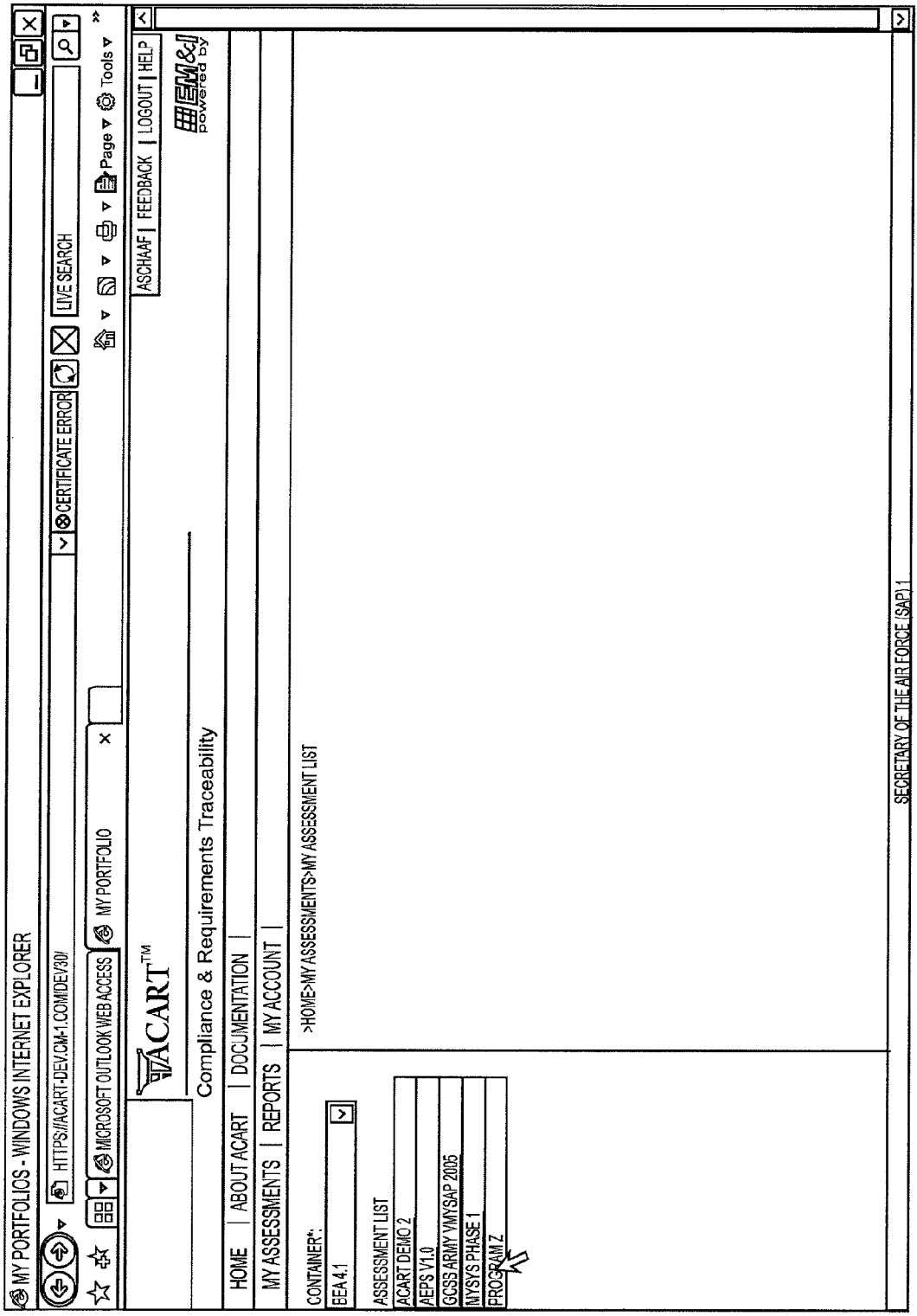
FIGS. 7-10 depict exemplary screen shots presented to a user, consistent with the principles of some embodiments of the present invention.

The process begins when the user selects an assessment (in this case the user selects "Program Z") (FIG. 6A, step 602). FIG. 7 is an exemplary screen shot that may be presented to the user in order to enable the user to select "Program Z." "Program Z" is a compliance assessment established for the purpose of assessing, measuring and reporting compliance against the requirements in the BEA 4.1 container. An administrator of the system may create Program Z. In creating the Program Z, one or more containers may be identified by associating a link to the container(s) with Program Z (i.e., BEA 4.1).

Figure 8:
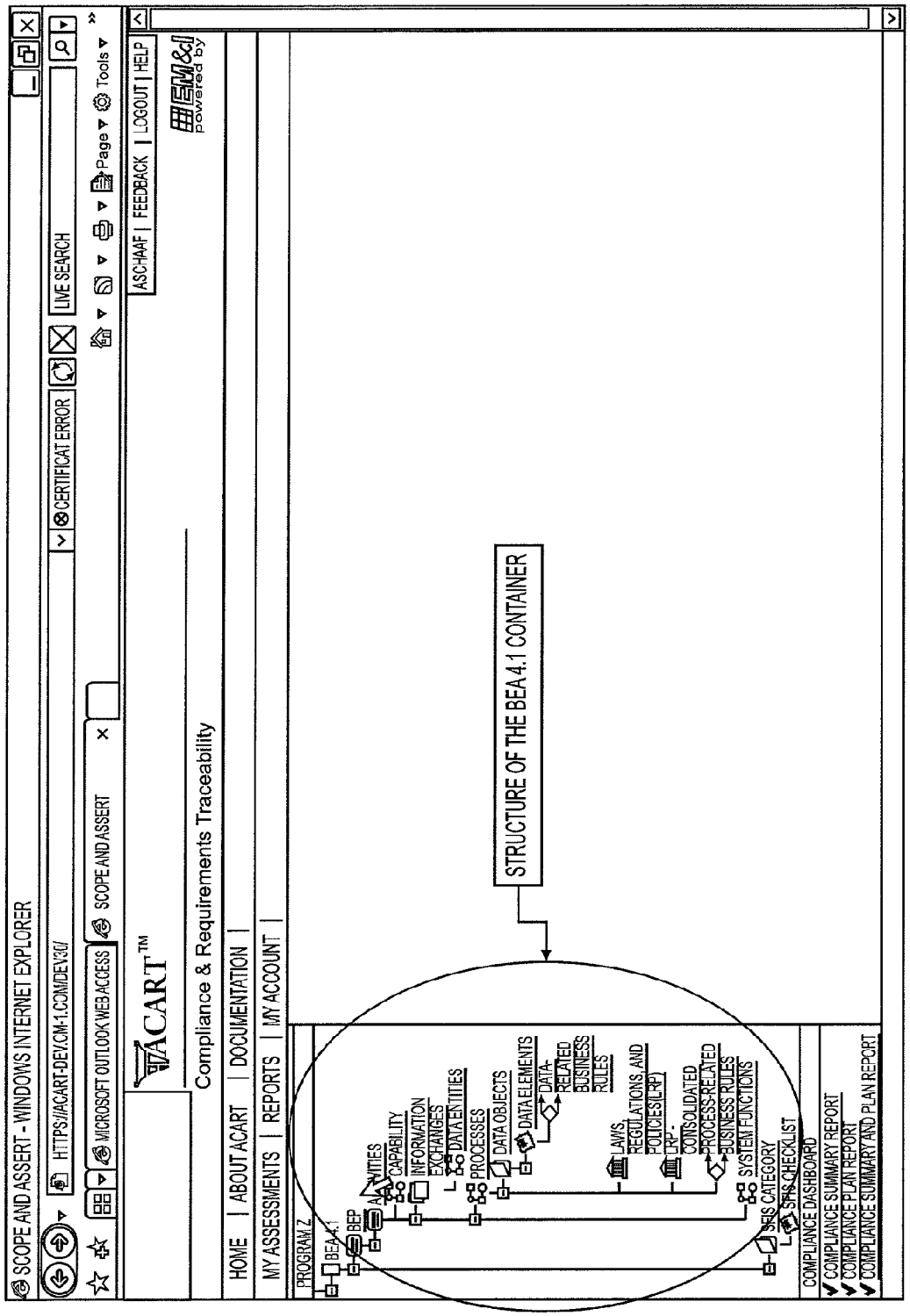

Once "Program Z" has been selected the Container Navigation Module 404 accesses, or pulls, the container meta data (via the Container Meta Data Management Module 544) for BEA 4.1, from the Compliance Database, 106 necessary to build the container navigation control (FIG. 6A, step 604). Specifically, object types and relationships between object types are queried from the Compliance Database 106 and that information is used to create the navigation control. FIG. 8 depicts an exemplary screen shot, presented to a user, depicting a tree structure representing the structure of the selected Container (i.e., BEA 4.1).

A request is made by the user via the container navigation module 404 to view specific contents of the BEA 4.1 Container. (i.e., the user clicks on a menu item, in this example the user select the menu item/object type/requirement type Business Enterprise Priority "BEP") (FIG. 6A, step 606). It may be appreciated that if more than one container is associated with "Program Z", the user may select the container from the navigation control he wishes to access requirements from. (See FIGS. 7 and 8)

The container meta data management module 544 takes the request (e.g., the container name and container object type) and extracts the meta data from the Compliance Database needed to build a query that will be executed against the BEA 4.1 container for the requirements requested by the user (i.e., BEP) (FIG. 6A, step 608).

The container meta data management module 544 provides the container query generator 542 with the meta data necessary to build an unfiltered query for the selected object in the container.

The container meta data management module 544 also provides the sieve module 540 with meta data associated with the parent object(s) for the object type selected by the users. The sieve module 540 will use this information to build a filter to be used by the container query generator 542.

The container query generator 542 takes the meta data passed to it via the container meta data management module 544 and builds the query that will be executed against the BEA 4.1 container (e.g., or any container managed by a $3^{rd}$ party and registered in the Compliance Database) (FIG. 6A, step 612). This query does not contain any filter information at this time.

The sieve module 540 takes the meta data provided from the "Container Meta Data Management Module", builds a query to get any parent requirements that have been previously selected by a user. The query is executed against the Compliance Database in order to get the necessary information to build the filter. (FIG. 6A, step 614).

The sieve module 540 takes the results of this query and transforms it into a filter that will be used by the container query generator 542. The filter will limit the requirements being queried from the container to those for which a parent requirement has been selected by the user (FIG. 6A, step 616).

The container query generator 542 takes the filter generated by the sieve module and combines it with the "Container Query" and executes the modified "Container Query" against the BEA 4.1 container (FIG. 6A, step 618). This modified query will ensure that only applicable requirements are retrieved from the container and displayed to the user.

This process may be repeated, as discussed herein, in order to retrieve all of the relevant children of the parent level objects.

The requirements & compliance information integration module 402 receives the results of the query executed against BEA4.1 and begins to go through each of its records. For each record, the requirements & compliance information integration module 402 builds a query to search for any compliance information that may have been previously stored in the Compliance Database (FIG. 6B, step 620). This compliance information may include plain text (e.g., text entered through text, drop down boxes or checkboxes) and in the case where requirements have been linked, the compliance information is in the form of pointer to one or more requirements in different containers. Any compliance information found in the Compliance Database is joined with the requirements from the container.

Figure 9:
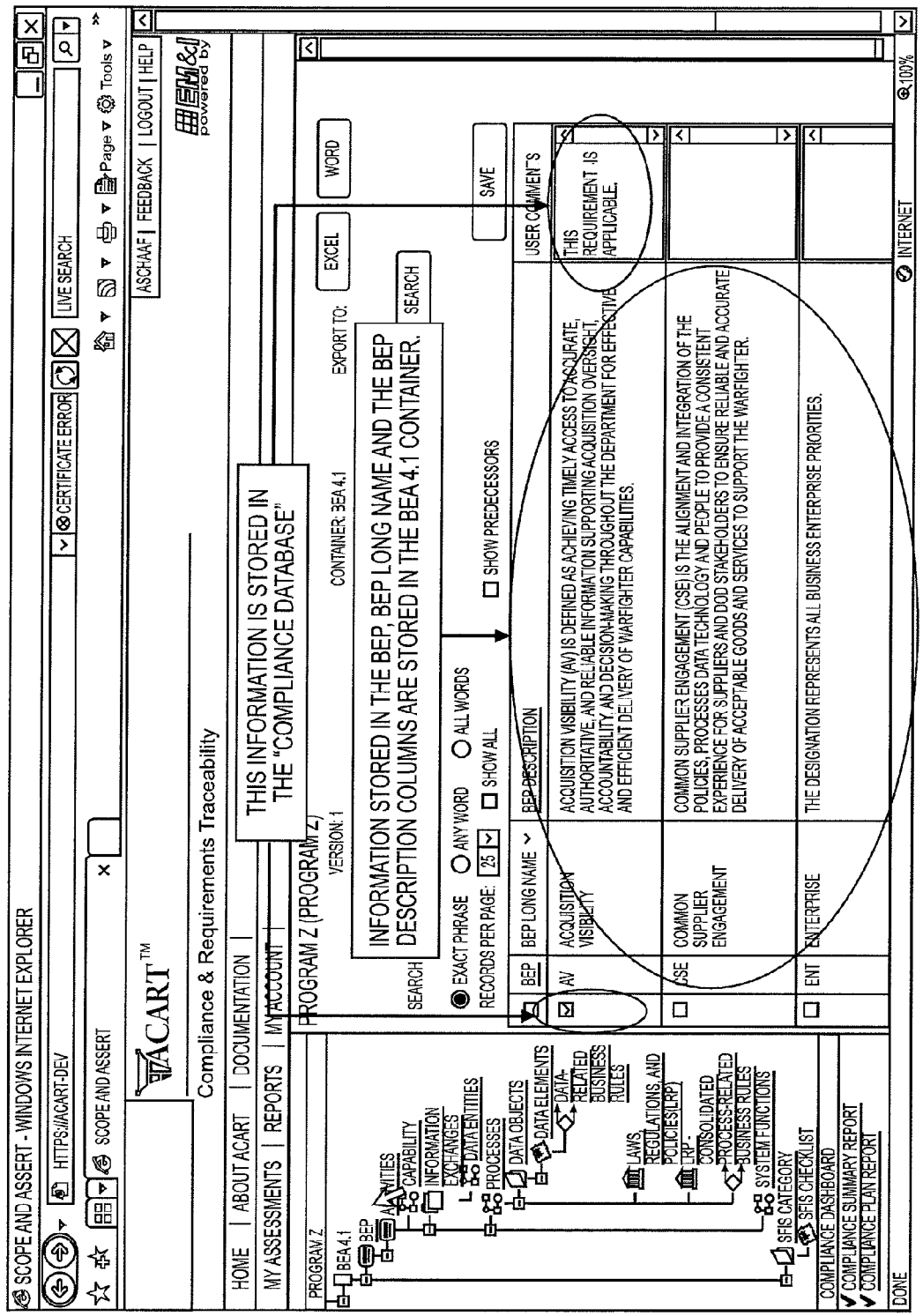
Figure 10:
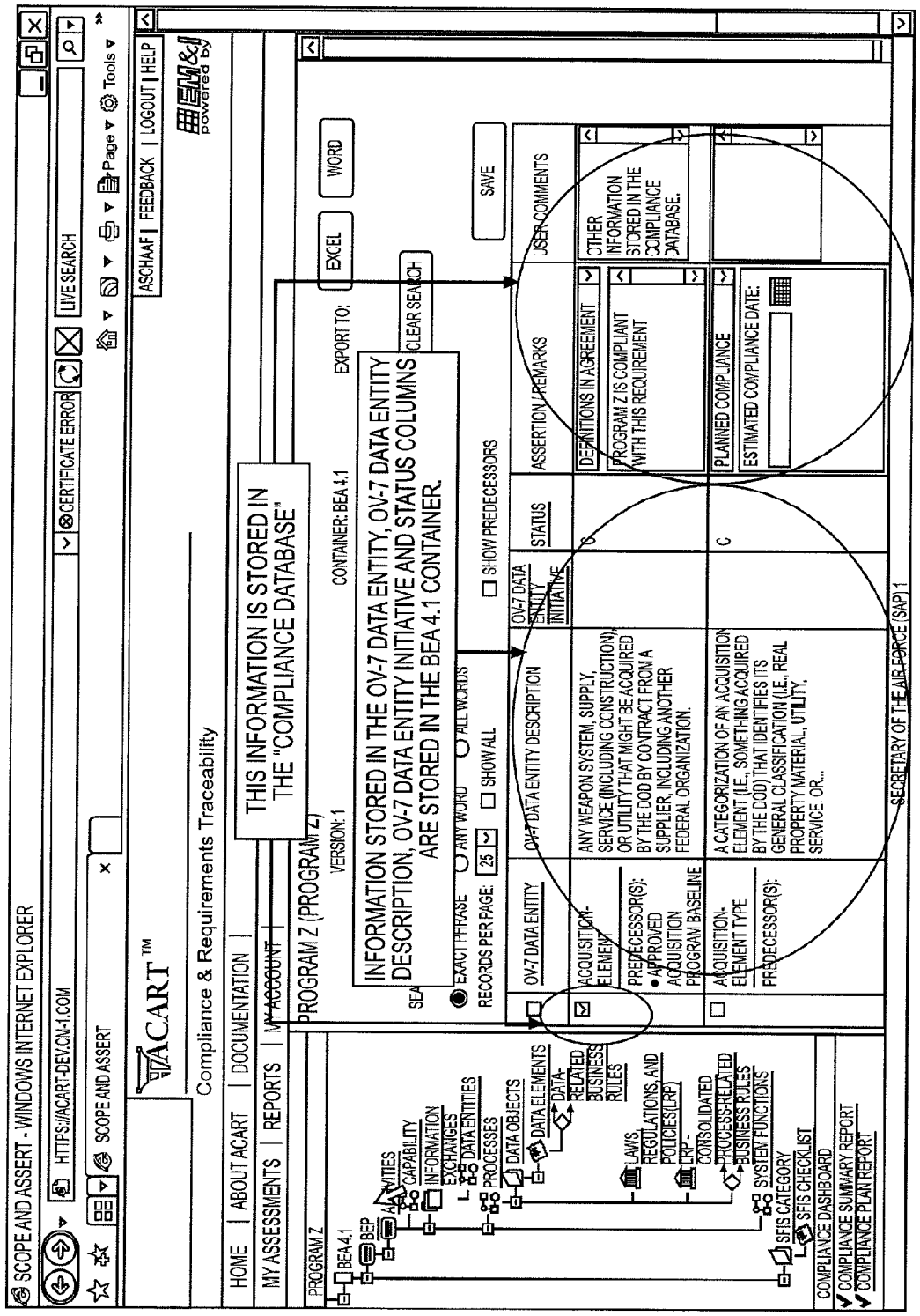

The resulting combination of the requirements from the container and the associated compliance information from the Compliance Database is presented to the user (FIG. 6B, step 622). FIGS. 9 and 10, provides exemplary screen shots of requirements combined with compliance information. FIG. 9 depicts the results presented to the user when requirements of type "BEP" are selected by the user and FIG. 10 depicts results presented to the user when requirements of type "Data Entity" are selected by the user.

If the user does choose to enter new or modify existing compliance information the requirements & compliance information integration module 402 saves the compliance information along with the pointers to the associated requirements in the Compliance Database 106.

In the case where the user wants to align or link a specific requirement with a requirement in a different container, the user would enter pointer information to that requirement resident in the other container. A different screen or set of screens may be used when linking requirements. They would enable the user to navigate through the requirements in a different container, select those requirements that are to be linked, add additional text clarifying the relationship between the linked requirements and save that information in the Compliance Database.

Sieve Module 540

A purpose of the sieve module 540 is to ensure that only applicable requirements are presented to the user of the Compliance Assessment Tool (i.e., non relevant requirements are automatically filtered out based compliance information stored for parent requirements). In this case, the compliance information is the selection of the requirement by the user. The sieve module takes container meta data associated with the object selected by the user (provided by the Container Meta Data Management Module) and looks for compliance information stored in the compliance database for parent level requirements and extracts the pointer information (e.g., container id, table name, primary key value) for those requirements that have associated compliance information. Using this pointer information associated with the parent level requirements the Sieve Module builds a filter that will be joined with the query that will be executed on the container database. The filter will limit the requirements being queried from the container to those for which a parent requirement has been previously selected by the user.

Figure 11:
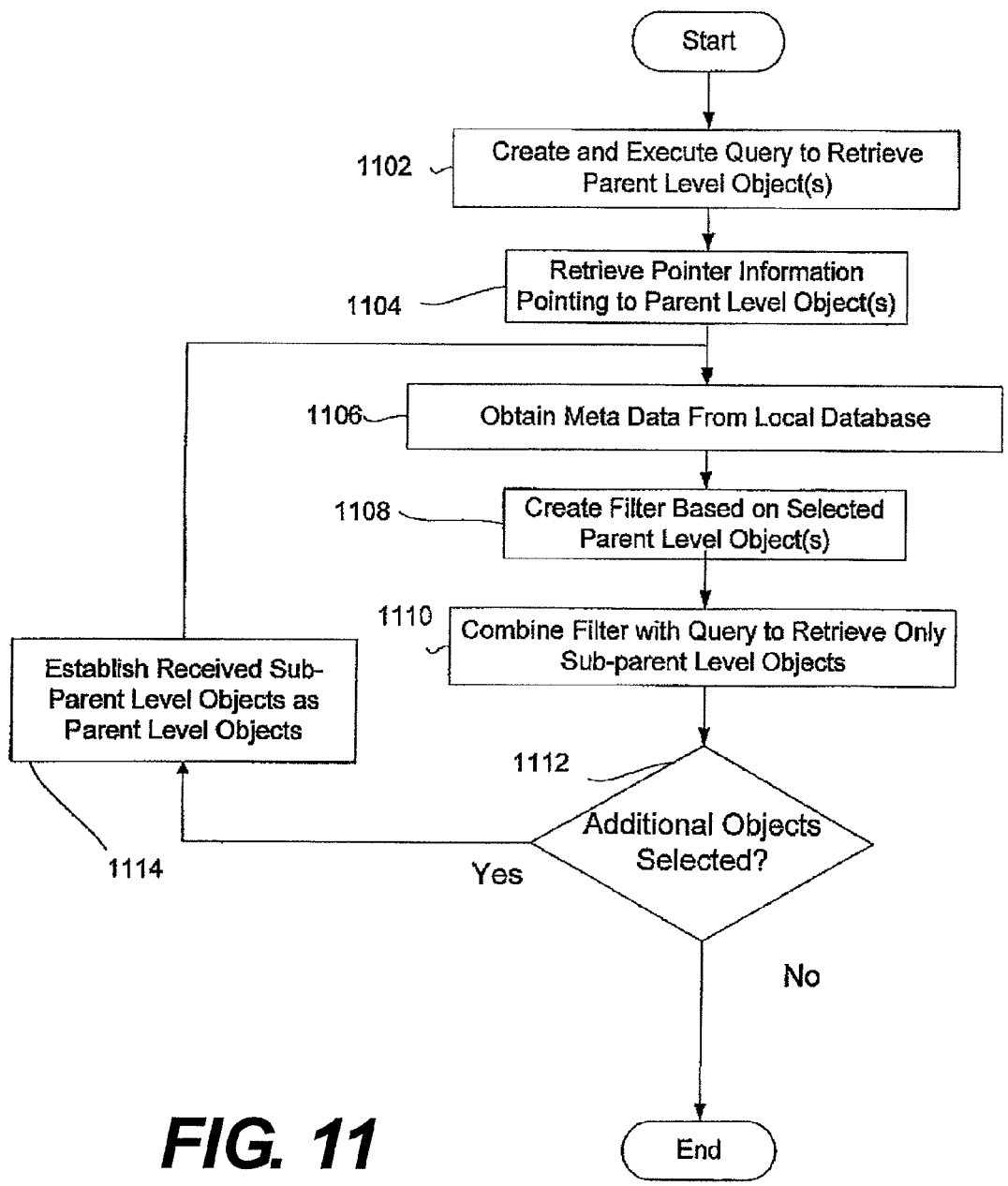
FIG. 11 depicts an exemplary flow diagram of the steps performed within the sieve module, consistent with the principles of some embodiments of the present invention.

FIG. 11 depicts an exemplary flow diagram of the steps performed by sieve module 540. As shown in FIG. 11, sieve module creates a filter used to extract requirement information from a remote database, i.e., containers 112, 144. The sieve module creates and executes a first query at compliance information 410 at compliance database 106 to retrieve at least one parent level object previously selected by a user (FIG. 11, step 1102).

Sieve module then retrieves pointer information pointing to the at least one parent level object stored in a remote container based on the executed query (FIG. 11, step 1104).

Sieve module then obtains meta data from container meta data 412 at compliance database 106 via the container meta data management module 544, the meta data relating to the remote database and the meta data being associated with the retrieved at least one parent level object (FIG. 11, step 1106). The sieve module then creates and executes a query against compliance information 410 at compliance database 106 to retrieve any compliance information associated with the selected at least one parent level object.

Sieve module then creates a filter to be executed against the container database 112, 114 based on the retrieved pointer information pointing to the at least one parent level object, the retrieved compliance information associated with the selected at least one parent level object, and based on the obtained meta data associated with the retrieved at least one parent level object (FIG. 11, step 1108). The created filter is passed to the container query generator 542. At the container query generator 542, the filter is combined with a second query to be executed at the container database 112, 114 to retrieve only sub-parent level objects associated with the retrieved at least one parent level object (FIG. 11, step 1110).

The sub-parent level objects are then presented to the user on the display. The system then enables the user to select at least one of the sub-parent level objects. Once the system receives an indication that the user had made all of his selections. This process is repeated, as noted above, in order to obtain the grandchildren of the selected sub-parent (or children) objects. (FIG. 11, step 1112). If there are sub-parent or children level objects selected by the user, upon receipt of an indication by the user, i.e., a request to obtain the relevant grandchildren, processing proceeds to step 1106 in FIG. 11. If there are no additional sub-parent level objects selecting, the sieve module processing is concluded.

Container Interface Management Module 406

Figure 12:
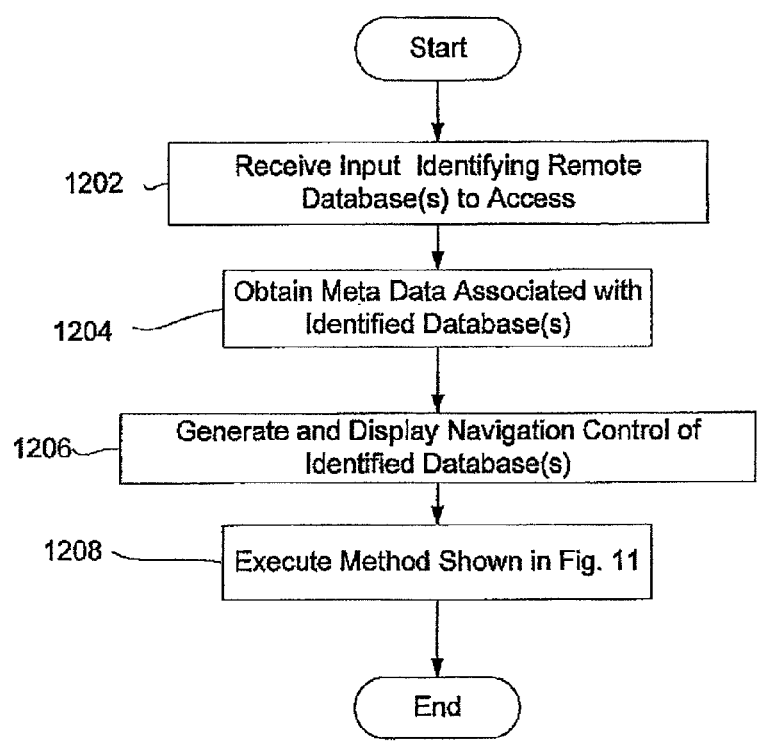
FIG. 12 depicts an exemplary flow diagram of the steps performed within the container interface management module, consistent with the principles of some embodiments of the present invention.

FIG. 12 depicts an exemplary flow diagram of the steps performed by container interface management module 406 to facilitate access and retrieval of data stored in containers 112, 114. Container interface management module 406 enables access to the plurality of containers 112, 114. It may be appreciated by one skilled in the art that container 112 may be have a different data structure than the data structure of container 114.

Container interface management module 406 receives input identifying at least one of the plurality of containers for accessing (FIG. 12, step 1202).

Container interface management module 406 obtains meta data locally stored and associated the identified at least one container (FIG. 12, step 1204).

Container Navigation Module 404 generates a navigation control and displaying the navigation control (FIG. 12, step 1206).

Container interface management module 406 receives input from the user identifying an object type related to and identifying a remote container and establishes and manages the connection to the remote database(s). Container interface management module 406 creates and executes a first query at the identified container(s) to obtain all parent level objects associated with the selected at least one object type. Container interface management module 406 receives input identifying at least one selected parent level object from the obtained parent level objects (an object or requirement within the identified remote container) and stores the input of this compliance information in compliance information 410 in compliance database 106. Container interface management module 406 queries (a second query) compliance database 106 for meta data, the meta data relating to the identified at least one container and the meta data being associated with the selected at least one parent level object. Container interface management module 406 creates and executes a third query at the at least one remote database to retrieve only sub-parent level objects associated with the selected at least one parent level object. The third query includes a filter, based on the obtained meta data, retrieved compliance information, and the selected at least one parent level object, for filtering out sub-parent level objects that are only associated with non-selected parent level objects. The filter is discussed above with regard to the Sieve module.

In other words, the second query, including the filter, is executed at the at least one remote database and only selects those sub-parent level objects that are associated with the parent level objects. Those sub-parent level objects that are associated with parent level objects that are not selected, are not retrieved with the results of the executed second query.

Container Meta Data Management Module 544

A purpose of the container meta data management module 544 is to process requests and provide the needed meta data for the container navigation module 404, sieve module 540 and the container query generator 542. For the container navigation module it pulls the meta data needed (including object names and the relationship between the objects) to build the navigation control. For the sieve module it retrieves the container meta data associated with the parent of the object selected by the user on navigation control. The sieve module uses this information to build the filter that will be used by the container query generator. For the container query module it extracts the all the container meta data needed to build executable queries (e.g., table names storing the requirements and the columns in those tables which are to be displayed to the user).

Container Query Generator 542

A purpose of the container query generator is to build and execute queries against the containers to retrieve requirements requested by the users of the compliance assessment tool. Prior to executing queries against a container the container query generator will apply any filters produced by the sieve module. FIG. 12A depicts an exemplary container query structure that does not include the filter created by the sieve module.

FIG. 12B depicts an exemplary container query structure that includes the filter created by the sieve module. Details regarding the components of the query and the filter are shown in the figure. Attributes, tables, etc., may be found with regard to the data structure diagram shown in FIG. 5A.

Description of Requirements Filtering

Figure 13:
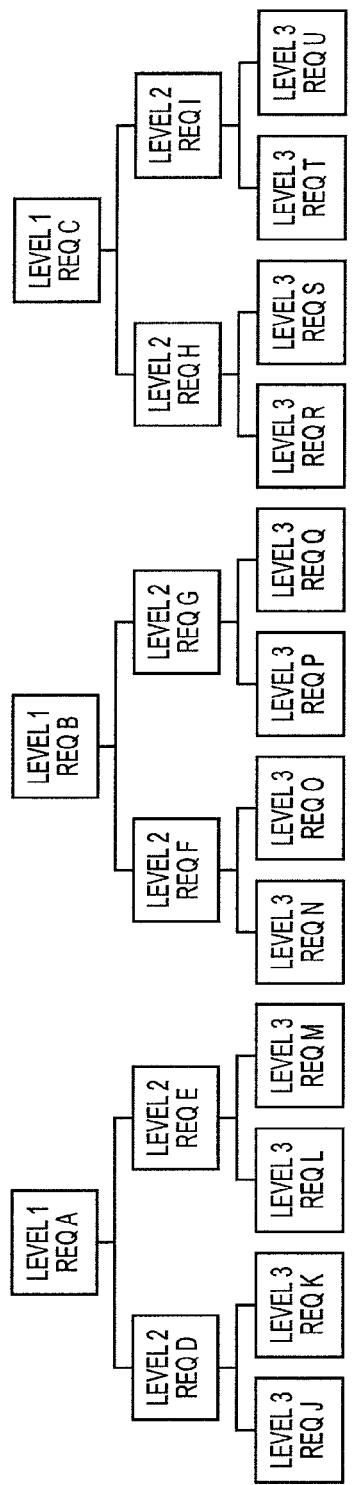
FIG. 13 depicts an exemplary structure of requirements in requirements database, consistent with the principles of some embodiments of the present invention.

This section provides a description of how requirements are filtered based on compliance information stored in the compliance database. In this example an individual is using the compliance assessment tool to perform a compliance assessment of an entity (e.g., systems, programs, policies, agencies etc.), "Program Z", against the requirements contained in "Requirements Database X". FIG. 13 provides a depiction of a container (e.g., requirements database) storing 3 levels of requirements and sub-requirements.

Figure 14:
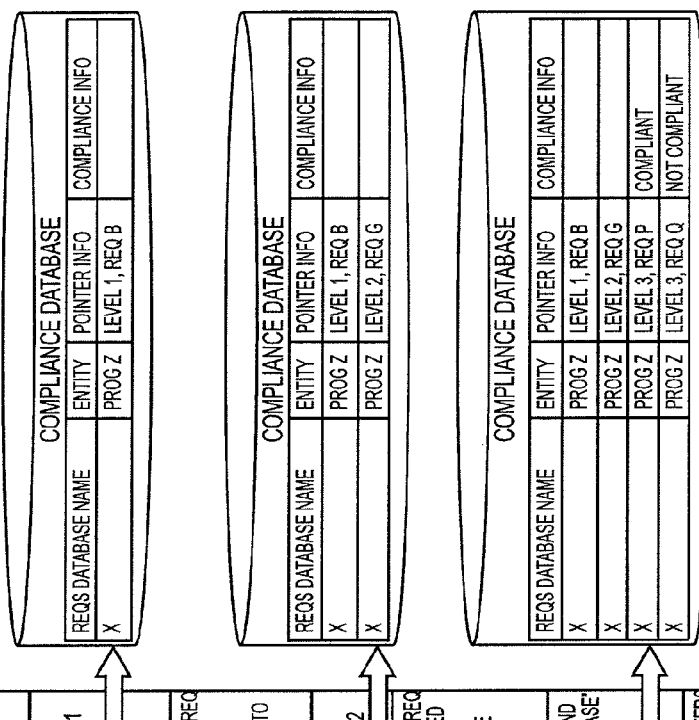
FIG. 14 depicts an exemplary diagram setting forth the filtering function, consistent with the principles of some embodiments of the present invention.

FIG. 14 explains the filtering functionality of the Compliance Assessment Tool and what information is stored in the system (e.g., in the system's Compliance Database). It also demonstrates that the contents of the "Requirements Database X" do not need to be changed (i.e., it is read only). The system may only read information from "Requirements Database X" but stores pointers to requirements and compliance information in the Compliance Database. As can be seen in step 1, the user desires to see all of the high level requirements (parent objects) that are relevant to "Program Z". To facilitate this, the user transmits a request to list all level 1 (parent) requirements. The compliance assessment tool, in accordance with the processes discussed herein, queries all level 1 requirements from the requirements database (container) and presents, displays, the list to the user.

At step 2, the user identifies Level 1 Req B as being applicable by selecting Level 1 Req B. The compliance assessment took stores pointer information in the compliance database 106 for Level 1 Req B.

The user then desires to see what level 2 (sub-parent) requirements may be relevant to "Program Z" and submits a request for the level 2 requirements. Compliance assessment tool, based on the previously selected Level 1 Req B, queries only those level 2, (sub-parent) sub requirements (Level 2 Req F and Level 2 Req G) and presents them to the user on the display.

The user then identifies Level 2 Req G as applicable to "Program Z" by selecting Level 2 Req G. Compliance assessment tool stores pointer information in the compliance database 106 for Level 2 Req G.

The user then desires to see the Level 3 Requirements that may be relevant to "Program Z" and submits an appropriate request. Based on the selected Level 2 Req G, compliance assessment tool accesses only those sub requirements (Level 3 Req P and Level 3 Req Q) from the container and presents, displays, them to the user.

The user makes a determination that "Program Z"is compliant to Level 3 Req P and not compliant to Level 3 Req Q. The user submits this compliance information and the compliance assessment tool stores pointer and compliance information in the compliance database for Level 3 Req P and Level 3 Req Q.

The user may then request to view all of the compliance information associated with "Program Z". In response to this request, the compliance assessment tool queries the pointers and compliance information from the compliance database for "Program Z". Based on the pointers to requirements, the compliance assessment tool queries only relevant requirements from the requirements database X, the container, and merges this information with the query containing the compliance information. The result of the merge is a list of requirements along with compliance information. This list is presented or displayed to the user.

The Compliance Assessment Tool joins information from the requirements database with the information from the Compliance Database. It further provides the ability to transpose compliance assessment information over requirements stored in requirements databases located in geographically dispersed locations.

A data structure within the Compliance Database enables an infinite set of requirements databases (i.e., containers) to be registered in the Compliance Database; an infinite set of attributes for each particular requirement to be registered and subsequently pulled from the requirements databases; and an administrator of the system to configure how users can navigate through a requirements database. (See FIG. 8). When an administrator registers a container he/she enters the meta data for that container which defines what and how information is stored and structured in the container.

Further, the Compliance Assessment Tool stores compliance information for an entity or a group of entities; and links (e.g., federation, alignment etc.) requirements stored in different containers (e.g., requirements databases, intelligence databases, inventory databases etc.). This provides the capability to create one logical container based on the contents of two or more containers registered in the Compliance Assessment Tool.

Further, the Compliance Assessment Tool provides a code generator that enables data to be queried from a requirements database, or container, regardless of underlying requirements database physical structure (e.g., relational database, XML files, etc. . . . ); a code generator that automatically filters out non applicable sub-requirements based on previously selected parent requirements; and code generator that automatically integrates directly with CASE tools.

A method for assessing compliance of an object vis-à-vis requirements stored in one or more requirements databases, consistent with the principles of some embodiments of the invention, as discussed herein, comprising the following steps:

a) Configure the Compliance Database with container meta data needed to traverse that requirements database, said requirements database having relevant requirements to the object with at least one associated level of sub-requirements.

b) Select a broad requirement from the container and retrieving all sub-requirements associated there within.

c) store in said Compliance Database pointers for the selected requirements and associated sub-requirements.

d) Integrate information from the Compliance Database and the contents of the container in order to display the requirements and the compliance information side by side. (see FIGS. 9 and 10).

Federation Module

The federation module enables a user to create links to related requirements between containers. As the user is navigating through requirements in a container the user may associate, or link, requirements from different containers.

The term "facet" may be interchangeable with the term "object type". The following terms may be defined as follows: Containers—represents a database containing an architecture or a set of requirements. Federal Container—The base container in which other containers are aligned to. State Container—The container(s) that is aligned to the "Federee Container". Integrated Container—A container that stores all the contents of the Federee Container plus all the aligned contents of the Federated Container(s). Facet/Sieve Object)—a type of object (e.g., operational activity, process, business rule, etc. . . . ) that exists within a container. Container object—an instantiation of a facet. (analogy: "operation activity" is to "Calculate Entitlement" as "facet" is to "container object": facet is the table, container object is a row in that table). Assertion Target—the item (e.g., portfolio, system, power plant, drug, policy, etc.) which is being evaluated for compliance. Federation Package—represents that a relationship between two containers have been established using the Federation Tool, or module. Alignment Values—These provide the text phrase that defines the relationship (e.g., "aligns to", "is the same as", "extends", etc.) between container objects. Copy Attribute—An attribute for each Alignment Value used to identify the business rule for copying assertion data (e.g., for relationship defined as "is the same as" the copy attribute could be "Copy Assertion Data". For a relationship defined as "extends" the copy attribute could be "Copy Assertion Data w/Conditions").

The ACART Federation Designer may be accessed by a software application residing on the user's computing device 108, 110, i.e., a Federation Designer application. The Designer may display unlimited number of containers for federation. Users may be allowed to display/hide any/all containers with which they have access rights to federate (e.g., based on what is in the "user_to_container" table). The designer may provide expanding/contracting of unlimited number of hierarchical container objects (i.e., requirements) in each container.

The designer may allow users to select a container object and drag/drop a line from that object (tree node) to another container's object(s). The designer may allow one container object to be associated with one or more other container objects. Additionally, container object A can be associated to container object B at the same time container object B is associated to container object A (e.g., relationships between container objects is based on the direction in which container object B is associated with container object A.

Relationship lines may be selectable and users may set properties of that relationship. Properties may consist of a description of a relationship (i.e. 'is equal', 'extends', 'is similar', etc.), the requirements that are related and comments for the relationship. When a user double-clicks container objects (tree nodes), a small window may open displaying the attribute information for that object. Attribute information may include the name of the requirement, a description of the requirement, an identification number of the requirement, identifying information of the creator of the requirement, editorial comments by any users, history of the requirement, etc.

The designer may provide printing and print previewing of federated containers. The designer may save the position of all containers from the user's last session and will allow users to save different sessions. The designer may incorporate the ACART Discovery service accessible through the designer menu bar. This may support federating containers by enabling users to search the different containers for similar container objects. In order to generate a SQL query to perform a discovery search, the container meta data management module retrieves the meta data for all of the containers the user wishes to search in. The meta data is then passed to the container query generator to create a set of queries to search all of the containers designated by the user. The discovery service may thus facilitate a key word search for key words in multiple containers, wherein the containers may have different data structures.

Operations of the Federation Module

Through the ACART web interface an individual may be given access and assigned the role as "Architect". The user given the role of "Architect" loads the "Federation" module onto their computing device 108, 110 and configures it to point to a particular instance of ACART. After configuration of the Federation module, the "Architect" creates a "Federation Package". When creating the "Federation Package" the "Architect" selects a minimum of two "Containers" to align/federate. The "Architect" then identifies the object types from the different containers that will be aligned (e.g., "Operational Activities" from BEA 5.0 will be aligned with "Master Capabilities" from the ASCA 3.0 etc.). Additionally, the "Architect" will define the "Alignment Values" (e.g., "aligns to", "is the same as", "extends", etc.) that represent how these object types can be related. FIG. 15 depicts an exemplary screen shot that may be presented to a user enabling the creation and configuration of a "Federation Package".

Alignment Phase of the Federation Module

Figure 16:
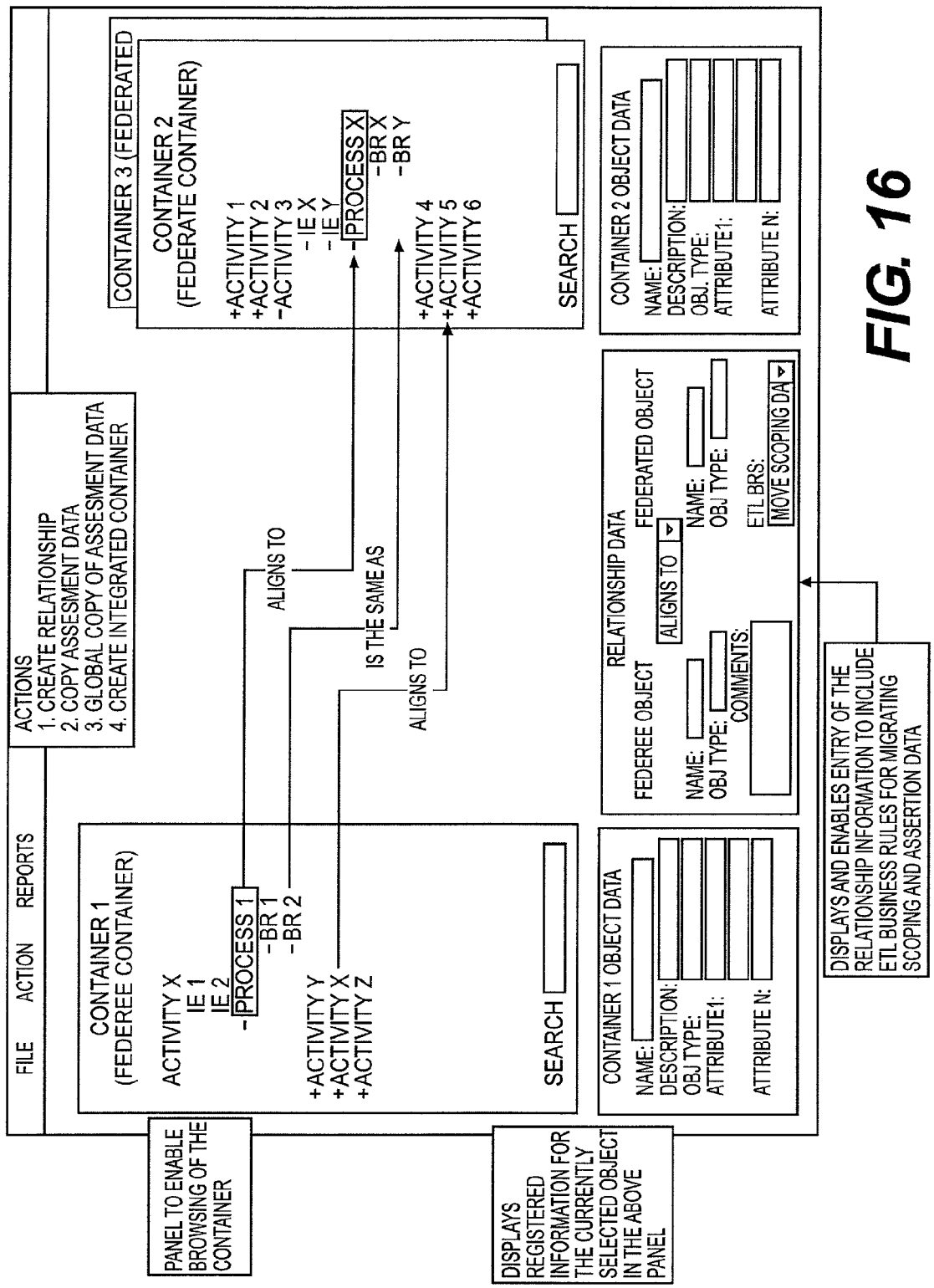

During the alignment phase, the "Architect" runs the Federation Module and selects a "Federation Package". Within a single screen the Federation Module brings up a separate panel for each container, an additional panel to display information (e.g., the attributes of an object which have been registered in ACART and resident within the container) for a selected object plus a panel to display the relationship information. FIG. 16 is an exemplary screen shot, presented to a user showing the different containers and requirements included therein.

The "Architect" navigates through each container (e.g., using a tree control) looking for container objects to align. When two objects, one from each container, have been identified as needing to be aligned, the "Architect" selects from the top menu a toggle switch that enables him to draw lines (e.g., make associations). He/she then connects the two objects and enters the information, in the 3$^{rd}$ panel, associated with the relationship. Alternatively, the relationship between objects may be made using drop down menus next to each requirement that display a structured list of requirements from the different containers. An additional panel for each container panel will allow the information associated with the selected object to be displayed. When making the association between container objects the direction is indicated by arrows. The association, or link, between the container objects may be stored in compliance database 106.

When browsing through a container the user may use the "Discovery Service" to find objects. Using the results of the "Discovery Service" the tree view of the container may open up to the objects that are a match.

When aligning two or more container the user may selectively hide relationship lines based on "Object Alignments". The user may access this functionality from the Actions menu item. When accessing this functionality the user may be presented with a grid containing all the "Object Alignment" sets for the federation package along with a toggle switch next to each record that is used to specify whether to display or hide the relationships.

Reporting & Analysis Phase of Federation Module

Quick Align—a function that automatically creates a relationship between objects in different containers where the name, type and description are the exact same or where user specified criteria are satisfied.

Copy assessments associated with one container to assessments associated with a federated container. The copy functions may create a new assessment (for each assessment associated with the "Federal" container) with the same name and attributes except that it will be associated with w/ the "State" container. This may only be available when a "Federation Package" is opened. The type of copy functions available may be: Global Copy—Copies all assertion data for all assessments against one container to assessments associated with another container. Individual Copy—Copies only assertion data for a selected set of assessments.

Create Integrated Container. This function creates a new container and populates it with all the contents of the "Federal" container along with all the contents of the "State" container(s) that have been aligned.

Alternatively, it may be appreciated that a user, using the federation module, may copy requirements from one container and paste them to a different container. When the requirement is copied into the target container, it inherits the relationships of the requirements in the target container.

Reports

It may be appreciated that various reports may be generated using the federation module. For example, an alignment report may be generated that provides a table of listing all the Federal container objects (displaying attributes of those objects may be optionally provided), that have been aligned to, on one side of the report and the container objects associated with the State container(s) on the other side of the Report. This report, alternatively, may be limited by to a set of selected object types.

Analytical Tools

It may further be appreciates that analytical tools may be provided in the federation module. For example a federation browser may provide a graphical tool (similar to a node tree) to navigate through the alignments made between containers. When looking at the objects in the browser, the user may see the name and description of the object along with being able to distinguish the container to which the object belongs.

Data Structure of the Federation Module

Figure 17:
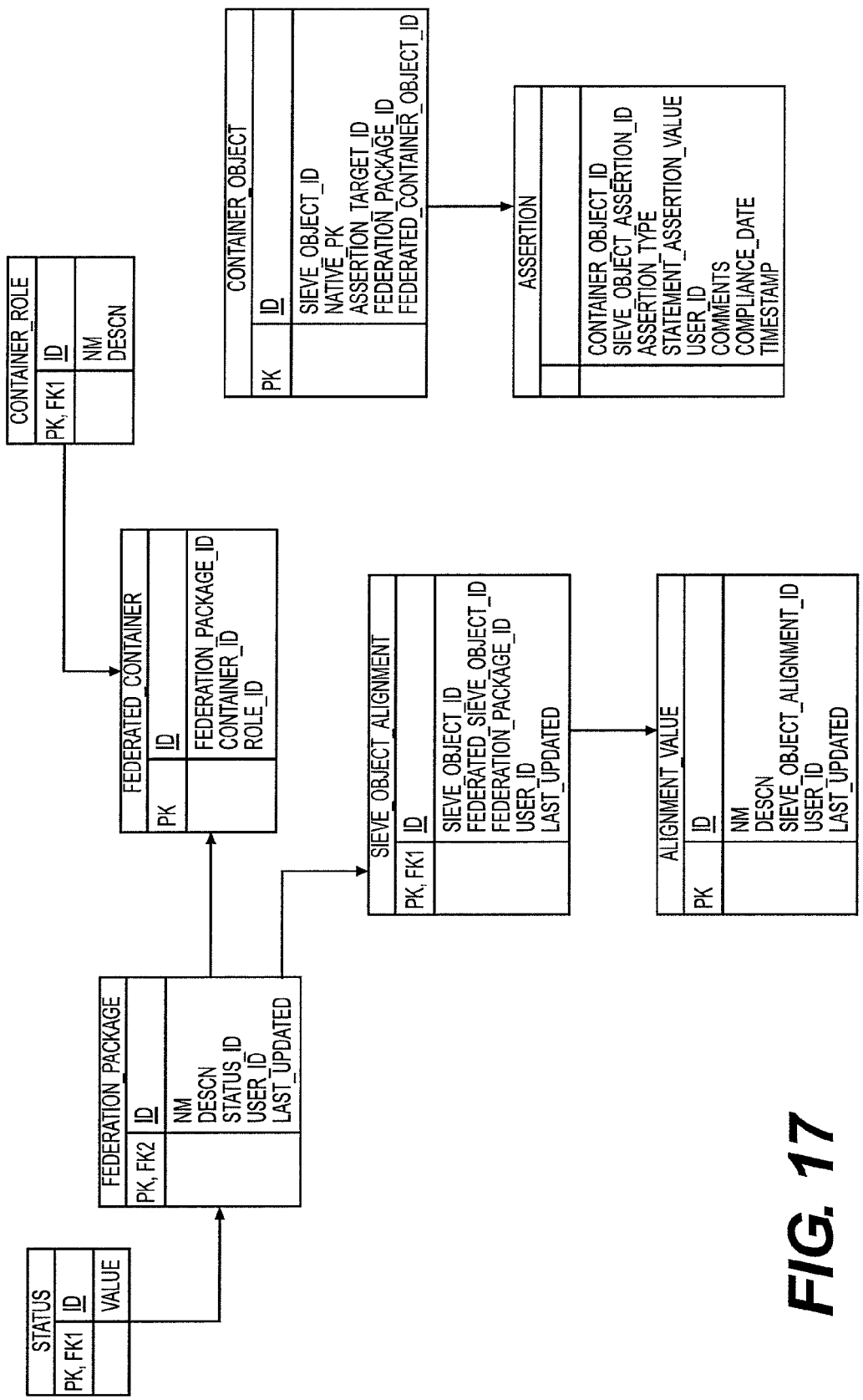
FIG. 17 depicts an exemplary data structure diagram of a data structure relating to a federation module, consistent with the principles of some embodiments of the present invention.

FIG. 17 depicts an exemplary data structure contains new tables and modification to existing tables (e.g., container_object and assertion) as previously set forth above.

What is claimed is:

1. A method for accessing data stored in at least one of a plurality of remote databases, the method comprising:
enabling access to the plurality of databases, at least two of the plurality of remote databases having different data structures;
receiving input identifying at least one of the plurality of remote databases for accessing;
obtaining meta data locally stored and associated with the identified at least one remote database;
generating a navigation control and displaying the navigation control on a display;
receiving input from a user identifying an object type;
creating and executing a first query at the identified at least one remote database to obtain all parent level objects associated with the at least one object type;
receiving input identifying at least one selected parent level object within the identified at least one remote database from the obtained parent level objects and storing the input onto a local database configured to store compliance information, wherein said compliance information includes meta data associated with the selected remote databases and information associated with parent and sub-parent level objects stored in the plurality of remote databases;
creating and executing a second query at the local database to obtain meta data from the local database, the meta data relating to the at least one remote database and the meta data being associated with the selected at least one parent level object;
creating and executing a third query at the at least one remote database to retrieve only sub-parent level objects associated with the selected at least one parent level object, wherein the third query includes a first filter, based on the meta data and the selected at least one parent level object, for filtering out sub-parent level objects that are only associated with non-selected parent level objects, and a second filter to be executed against the at least one remote database based on the selected at least one parent level object and based on meta data associated with the at least one remote database, the second filter provides selection of only those sub-parent level objects associated with the selected parent level object; and
providing, based on said compliance information, linking of a first requirement in at least one remote database to a second requirement in another remote database and storing information relating to the link of the two requirements in the local database.

2. The method of claim 1, wherein the retrieved sub-parent level objects are displayed on a display and selectable by the user.

3. The method of claim 2, further comprising:
receiving input from the user indicating selected sub-parent level objects, and
repeating the creating, receiving and obtaining steps for the sub-parent level objected selected by the user.

4. An apparatus, comprising:
a memory configured to store a set of instructions; and
a processor, configured to execute the stored set of instructions, to perform a method for accessing data stored in at least one of a plurality of remote databases, the method comprising:
enabling access to the plurality of databases, at least two of the plurality of remote databases having different data structures;
receiving input identifying at least one of the plurality of remote databases for accessing;
obtaining meta data locally stored and associated with the identified at least one remote database;
generating a navigation control and displaying the navigation control on a display;
receiving input from a user identifying an object type;
creating and executing a first query at the identified at least one remote database to obtain all parent level objects associated with the at least one object type;
receiving input identifying at least one selected parent level object within the identified at least one remote database from the obtained parent level objects and storing the input onto a local database configured to store compliance information, wherein said compliance information includes meta data associated with the selected remote databases and information associated with parent and sub-parent level objects stored in the plurality of remote databases;
creating and executing a second query at the local database to obtain meta data from the local database, the meta data relating to the at least one remote database and the meta data being associated with the selected at least one parent level object;
creating and executing a third query at the at least one remote database to retrieve only sub-parent level objects associated with the selected at least one parent level object, wherein the third query includes a first filter, based on the meta data and the selected at least one parent level object, for filtering out sub-parent level objects that are only associated with non-selected parent level objects, and a second filter to be executed against the at least one remote database based on the selected at least one parent level object and based on meta data associated with the at least one remote database, the second filter provides selection of only those sub-parent level objects associated with the selected parent level object; and
providing, based on said compliance information. linking of a first requirement in at least one remote database to a second requirement in another remote database and storing information. relating to the link of the two requirements in the local database.

5. The apparatus of claim 4, wherein the retrieved sub-parent level objects are displayed on a display and selectable by the user.

6. The apparatus of claim 5, wherein the method further comprises:
receiving input from the user indicating selected sub-parent level objects, and
repeating the creating, receiving and obtaining steps for the sub-parent level objected selected by the user.

7. A non-transitory computer-readable medium for accessing data stored in at least one of a plurality of remote databases, the method comprising:

enabling access to the plurality of databases, at least two of the plurality of remote databases having different data structures;

receiving input identifying at least one of the plurality of remote databases for accessing;

obtaining meta data locally stored and associated with the identified at least one remote database;

generating a navigation control and displaying the navigation control on a display;

receiving input from a user identifying an object type;

creating and executing a first query at the identified at least one remote database to obtain all parent level objects associated with the at least one object type;

receiving input identifying at least one selected parent level object within the identified at least one remote database from the obtained parent level objects and storing the input onto a local database configured to store compliance information, wherein said compliance information includes meta data associated with the selected remote databases and information associated with parent and sub-parent level objects stored in the plurality of remote databases;

creating and executing a second query at the local database to obtain meta data from the local database, the meta data relating to the at least one remote database and the meta data being associated with the selected at least one parent level object;

creating and executing a third query at the at least one remote database to retrieve only sub-parent level objects associated with the selected at least one parent level object, wherein the third query includes a first filter, based on the meta data and the selected at least one parent level object, for filtering out sub-parent level objects that are only associated with non-selected parent level objects, and a second filter to be executed against the at least one remote database based on the selected at least one parent level object and based on meta data associated with the at least one remote database, the second filter provides selection of only those sub-parent level objects associated with the selected parent level object; and providing, based on said compliance information, linking of a first requirement in at least one remote database to a second requirement in another remote database and storing information relating to the link of the two requirements in the local database.

8. The non-transitory computer-readable medium of claim 7, wherein the retrieved sub-parent level objects are displayed on a display and selectable by the user.

9. The non-transitory computer-readable medium of claim 8, further comprising:

receiving input from the user indicating selected sub-parent level objects, and repeating the creating, receiving and obtaining steps for the sub-parent level objected selected by the user.

* * * * *